(12) United States Patent
Kuehnle et al.

(10) Patent No.: US 11,623,591 B2
(45) Date of Patent: Apr. 11, 2023

(54) DETECTION OF SAFETY SYSTEM TAMPERING VIA DTC ANALYSIS

(71) Applicant: Bendix Commercial Vehicle Systems LLC, Elyria, OH (US)

(72) Inventors: Andreas U. Kuehnle, Villa Park, CA (US); Andre Tokman, San Clemente, CA (US); Shaun M. Howard, Irvine, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 323 days.

(21) Appl. No.: 16/951,762

(22) Filed: Nov. 18, 2020

(65) Prior Publication Data
US 2022/0164803 A1    May 26, 2022

(51) Int. Cl.
*B60R 16/023* (2006.01)
*B60R 25/30* (2013.01)
*B60R 25/32* (2013.01)
*B60R 25/20* (2013.01)
*G07C 5/08* (2006.01)
*G06Q 10/0635* (2023.01)
*H04L 67/12* (2022.01)

(52) U.S. Cl.
CPC .......... *B60R 16/0234* (2013.01); *B60R 25/20* (2013.01); *B60R 25/302* (2013.01); *B60R 25/32* (2013.01); *G07C 5/0808* (2013.01); *G07C 5/0841* (2013.01); *G06Q 10/0635* (2013.01); *H04L 67/12* (2013.01)

(58) Field of Classification Search
CPC ... B60R 16/0234; B60R 25/20; B60R 25/302; B60R 25/32; G07C 5/0808; G07C 5/0841
See application file for complete search history.

(56) References Cited

U.S. PATENT DOCUMENTS

| | | | |
|---|---|---|---|
| 5,706,199 A * | 1/1998 | Wilson | B60K 31/00 180/173 |
| 5,896,083 A | 4/1999 | Weisman, II et al. | |
| 2009/0037780 A1* | 2/2009 | Nakagaki | G06F 11/1402 714/48 |
| 2020/0175782 A1 | 6/2020 | Tokman et al. | |

* cited by examiner

*Primary Examiner* — Kam Wan Ma
(74) *Attorney, Agent, or Firm* — Crowell & Moring LLP

(57) ABSTRACT

A system detects tampering of an electronic system of a vehicle operated by a driver. The system receives historical occurrences of at least one diagnostic trouble code (DTC) generated by the onboard vehicle computing system based on sensor data received from a vehicle sensor during a trip. The system identifies a length of the trip and a speed of the vehicle when each DTC was generated. The system identifies a distance the vehicle had traveled when each DTC was generated. The system determines a subsequent trip was started, whether a driver operating the vehicle on the subsequent trip is a same driver or a new driver, whether DTCs were generated during the trip, and whether DTCs were generated during the subsequent trip. The system determines a tamper rating for the driver that indicates a likelihood that the driver has tampered with the vehicle.

20 Claims, 6 Drawing Sheets

DETECTION OF SAFETY SYSTEM TAMPERING VIA DTC ANALYSIS

BACKGROUND AND SUMMARY OF THE INVENTION

On-vehicle systems which collect driver-related and driving-related data, including video, and which provide warnings to drivers of potentially dangerous or undesirable behavior, are susceptible to tampering. For example, some drivers may find the act of being monitored to be intrusive, or for audible and visual warnings to be annoying or otherwise unwelcomed. As a result, such drivers may engage in various efforts to circumvent such monitoring systems. Additionally, these efforts may be temporary, and done on an as needed basis, hiding the driver's poor performance on selected, more difficult, road sections or only at certain times. It is desired to identify tampering, even in the presence of apparently normal, majority, behavior.

According to an embodiment of the disclosed subject matter, a method of detecting tampering with a vehicle operated by a driver includes receiving input data generated by an onboard vehicle computing system specifying historical occurrences of at least one diagnostic trouble code (DTC) generated by a processor of the onboard vehicle computing system based on sensor data received by the processor from a vehicle sensor during a trip. The method further includes identifying, based on the input data, a length of the trip. The method further includes identifying, based on the input data, a speed of the vehicle when each of the at least one DTCs were generated. The method further includes identifying, based on the input data, a distance the vehicle had traveled during the trip when each of the at least one DTCs were generated. The method further includes determining: (a) a subsequent trip was started based on the input data, (b) whether a driver operating the vehicle on the subsequent trip is a same driver or a new driver as the driver that operated the vehicle during the trip based on a driver ID of the input data, (c) whether DTCs were generated during the trip based on the input data, and (d) whether DTCs were generated during the subsequent trip based on the input data. The method further includes determining a tamper rating for the driver that indicates a likelihood that the driver has tampered with the vehicle based on the determinations (a)-(d), the identified length of the trip, the identified distance the vehicle had traveled during the trip when each of the at least one DTCs were generated, and the identified speed of the vehicle for each of the at least one DTCs. The method further includes identifying, based on the input data, one or more timestamps that indicate when each of the at least one DTCs were generated. The method further includes determining, based on the one or more timestamps, a distance traveled by the vehicle during which the at least one DTC was generated. The method further includes determining a benefit weight based on a distance traveled by the vehicle after which the at least one DTC was generated. The determination of the tamper rating of the driver is further based on the benefit weight. The method further includes determining a total tampering score by accumulating a weighted transition score for the trip and the subsequent trip. The weighted transition score is based on the identified distance the vehicle had traveled during the trip when each of the at least one DTCs were generated and the identified speed of the vehicle for each of the at least one DTCs. The identified distance the vehicle had traveled during the trip when each of the at least one DTCs were generated is based on a ratio between the identified length of the trip and the distance the vehicle had traveled during the trip for each of the at least one DTCs. The weighted transition score is inversely proportional to the identified vehicle speed. The weighted transition score is inversely proportional to the identified distance the vehicle had traveled during the trip prior to the generation of the at least one DTC. The method further includes attributing a first state of a finite state machine to a first vehicle state when no DTCs have been generated in the vehicle. The method further includes attributing a second state of the finite state machine to a second vehicle state when a first DTC is generated in the vehicle. The method further includes attributing a third state of the finite state machine to a third vehicle state when at least one second DTC is generated in the vehicle after the first DTC has been generated. The method further includes scoring each transition of the finite state machine between any of the first, second, or third states and a subsequent state based on a transition score value that varies based on at least one of determinations (a), (b), (c), or (d). The method further includes determining a weight transition score based on: the transition score and the identified distance the vehicle had traveled during the trip for each of the at least one DTCs or the identified speed of the vehicle for each of the at least one DTCs. The method further includes generating, based on the input data, a textual story including a listing of the at least one DTCs that were generated, whether DTCs started, continued, or ended as the driver and any new drivers operated the vehicle, the distance the vehicle traveled after DTCs had been generated in the vehicle for each driver, a proportion of trips for the driver where DTCs occurred when compared with the driver's total number of trips, a quantity of trips where DTCs occurred at the beginning of the trip while stopped or at low vehicle speeds, a listing of sensors and/or systems that were affected based on the at least one generated DTCs. The method further includes determining a performance metric of the driver when operating the vehicle. The method further includes determining the performance metric of a plurality of additional drivers when operating the vehicle. The method further includes determining the performance metric of the driver and the plurality of additional drivers when operating a plurality of additional vehicles. The method further includes determining that the vehicle is cursed based on a mean performance metric of the driver and additional drivers for the vehicle indicating reduced performance when compared with a mean performance metric of the driver and additional drivers for the plurality of additional vehicles. The method further includes offsetting the determined tamper rating of the driver based on the determination that the vehicle is cursed such that the tamper rating indicates that indicates a reduced likelihood that the driver has tampered with the vehicle.

According to an embodiment of the disclosed subject matter, a tampering detection system to detect tampering of an electronic system of a vehicle operated by a driver includes a processor, a memory in communication with the processor, the memory storing a plurality of instructions executable by the processor to cause the system to receive input data generated by an onboard vehicle computing system specifying historical occurrences of at least one diagnostic trouble code (DTC) generated by a processor of the onboard vehicle computing system based on sensor data received by the processor from a vehicle sensor during a trip. The memory further includes instructions to cause the system to identifying, based on the input data, a length of the trip. The memory further includes instructions to cause the system to identify, based on the input data, a speed of the vehicle when each of the at least one DTCs were generated.

The memory further includes instructions to cause the system to identify, based on the input data, a distance the vehicle had traveled during the trip when each of the at least one DTCs were generated. The memory further includes instructions to cause the system to determine: (a) a subsequent trip was started based on the input data, (b) whether a driver operating the vehicle on the subsequent trip is a same driver or a new driver as the driver that operated the vehicle during the trip based on a driver ID of the input data, (c) whether DTCs were generated during the trip based on the input data, and (d) whether DTCs were generated during the subsequent trip based on the input data. The memory further includes instructions to cause the system to determine a tamper rating for the driver that indicates a likelihood that the driver has tampered with the vehicle based on the determinations (a)-(d), the identified length of the trip, the identified distance the vehicle had traveled during the trip when each of the at least one DTCs were generated, and the identified speed of the vehicle for each of the at least one DTCs. The memory further includes instructions to cause the system to identify, based on the input data, one or more timestamps that indicate when each of the at least one DTCs were generated. The memory further includes instructions to cause the system to determine, based on the one or more timestamps, a distance traveled by the vehicle during which the at least one DTC was generated. The memory further includes instructions to cause the system to determine a benefit weight based on a distance traveled by the vehicle after which the at least one DTC was generated. The determination of the tamper rating of the driver is further based on the benefit weight. The memory further includes instructions to cause the system to determine a total tampering score by accumulating a weighted transition score for the trip and the subsequent trip. The weighted transition score is based on the identified distance the vehicle had traveled during the trip when each of the at least one DTCs were generated and the identified speed of the vehicle for each of the at least one DTCs. The identified distance the vehicle had traveled during the trip when each of the at least one DTCs were generated is based on a ratio between the identified length of the trip and the distance the vehicle had traveled during the trip for each of the at least one DTCs. The weighted transition score is inversely proportional to the identified vehicle speed. The weighted transition score is inversely proportional to the identified distance the vehicle had traveled during the trip prior to the generation of the at least one DTC. The memory further includes instructions to cause the system to attribute a first state of a finite state machine to a first vehicle state when no DTCs have been generated in the vehicle. The memory further includes instructions to cause the system to attribute a second state of the finite state machine to a second vehicle state when a first DTC is generated in the vehicle. The memory further includes instructions to cause the system to attribute a third state of the finite state machine to a third vehicle state when at least one second DTC is generated in the vehicle after the first DTC has been generated. The memory further includes instructions to cause the system to score each transition of the finite state machine between any of the first, second, or third states and a subsequent state based on a transition score value that varies based on at least one of determinations (a), (b), (c), or (d). The memory further includes instructions to cause the system to determine a weight transition score based on: the transition score and the identified distance the vehicle had traveled during the trip for each of the at least one DTCs or the identified speed of the vehicle for each of the at least one DTCs. The memory further includes instructions to cause the system to generate, based on the input data, a textual story including a listing of the at least one DTCs that were generated, whether DTCs started, continued, or ended as the driver and any new drivers operated the vehicle, the distance the vehicle traveled after DTCs had been generated in the vehicle for each driver, a proportion of trips for the driver where DTCs occurred when compared with the driver's total number of trips, a quantity of trips where DTCs occurred at the beginning of the trip while stopped or at low vehicle speeds, a listing of sensors and/or systems that were affected based on the at least one generated DTCs. The memory further includes instructions to cause the system to determine a performance metric of the driver when operating the vehicle. The memory further includes instructions to cause the system to determine the performance metric of a plurality of additional drivers when operating the vehicle. The memory further includes instructions to cause the system to determine the performance metric of the driver and the plurality of additional drivers when operating a plurality of additional vehicles. The memory further includes instructions to cause the system to determine that the vehicle is cursed based on a mean performance metric of the driver and additional drivers for the vehicle indicating reduced performance when compared with a mean performance metric of the driver and additional drivers for the plurality of additional vehicles. The memory further includes instructions to cause the system to offset the determined tamper rating of the driver based on the determination that the vehicle is cursed such that the tamper rating indicates that indicates a reduced likelihood that the driver has tampered with the vehicle.

Other objects, advantages and novel features of the present subject matter will become apparent from the following detailed description of one or more preferred embodiments when considered in conjunction with the accompanying drawings.

DETAILED DESCRIPTION OF THE DRAWINGS

Figure 1:
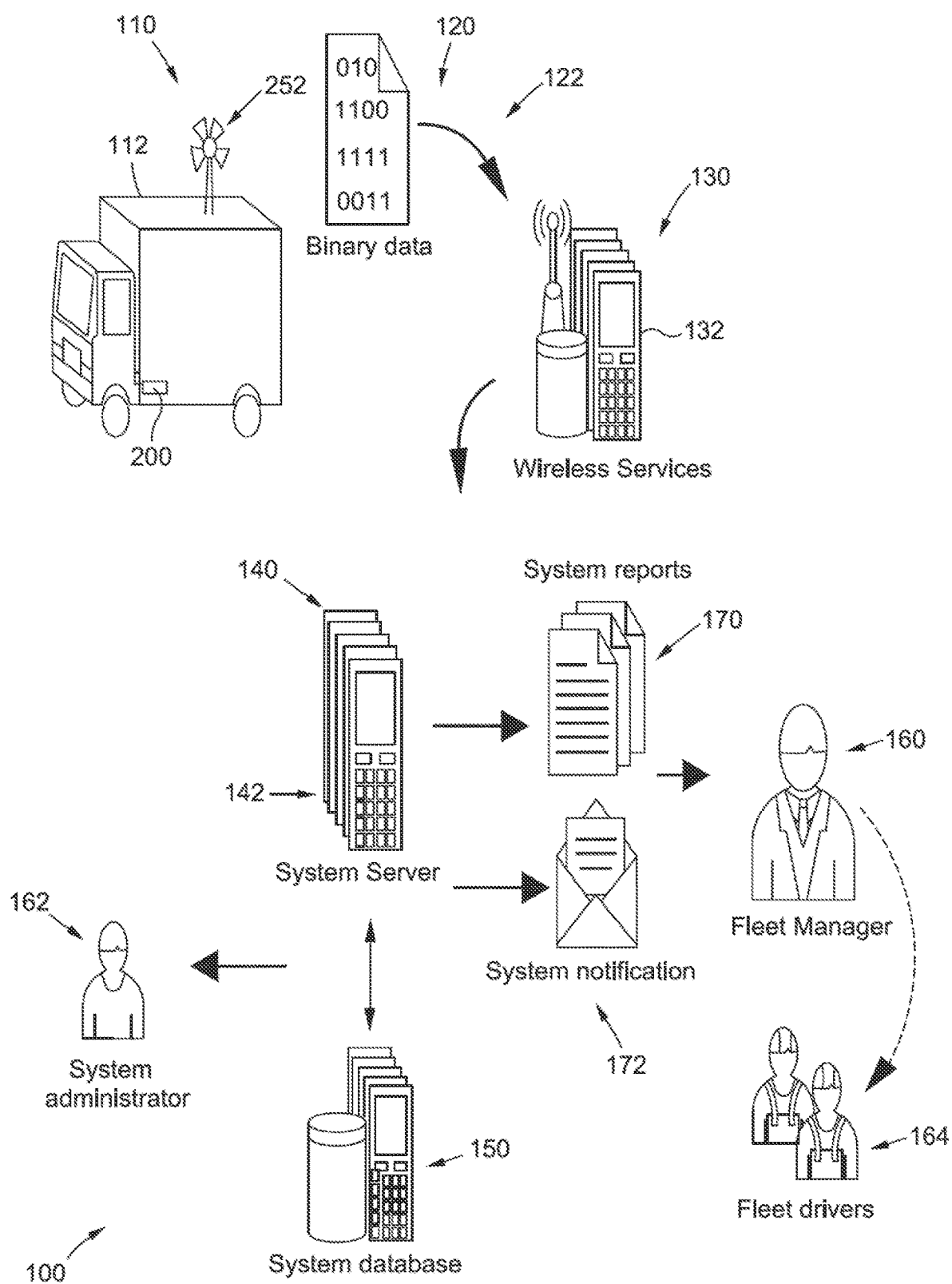
FIG. 1 is a diagram of an overview of a fleet management system in accordance with an embodiment of the present subject matter.

In the following description of the present subject matter, reference is made to the accompanying figures which form a part thereof, and in which is shown, by way of illustration, exemplary embodiments illustrating the principles of the present subject matter and how it may be practiced. Other embodiments can be utilized to practice the present subject matter and structural and functional changes can be made thereto without departing from the scope of the present subject matter.

Commercial vehicle systems that collect driver and driving-related data, including audio, video, and which provide warnings to drivers of potentially dangerous or undesirable behavior, are susceptible to tampering. For example, some drivers may find the act of being monitored to be intrusive, or for audible and visual warnings to be annoying, or otherwise unwelcome. As a result, such drivers may engage in tampering efforts to circumvent such monitoring systems and to reduce or eliminate warning indicators. Additionally, these efforts may be temporary and performed on an as-needed basis to hide a driver's behaviors and performance.

Drivers of commercial vehicles may often use multiple, different, commercial vehicles for performing their work and may perform differently on different vehicles. The driver's performance may be measured by the miles that elapse between various monitoring or safety-relevant events, for example. These events may originate from a variety of sources, including the driver, the vehicle being operated, other vehicles on the road, location-based systems, cloud-based systems, and the like. Vehicle issues may be determined from the diagnostic trouble codes (DTCs) generated by the safety-relevant or monitoring events and/or changes in the frequency of measured driver events, for example.

A tampering detection system according to the present subject matter may examine the DTC history of a vehicle and/or of a driver of interest across one or more vehicles operated by the driver. The tampering detection system may be configured to identify patterns in the DTC history and interactions between the driver and the operated vehicle. The tampering detection system may further identify trends, sudden departures from established patterns, incorrect vehicle and/or driver behaviors, and suspected tampering with vehicle systems.

As used herein, tampering shall be understood to mean the unauthorized modifying, altering, changing, adjusting, disconnecting, disengaging, disrupting, or hacking of a vehicle or vehicle-associated system with a nefarious purpose, such as to gain some advantage that may be achieved by performing the tampering. Tampering may alter the behavior of vehicle systems and may come in many forms, include blocking or reducing the effectiveness of sensors (e.g., covering the radar, applying petroleum jelly over a camera sensor, etc.), disconnecting a sensor (e.g., by cutting wires or unplugging it), disconnecting and then later reconnecting a sensor, thus preventing data collection while the sensor is disconnected, and forcing a sensor into a fixed state such as by disabling a switch. Additional forms of possible tampering include starting a vehicle information system with a willfully deviant value to force an error, shorting or disconnecting wires to speakers that issue warnings, and the like.

Complicating the situation, many of the same effects resulting from tampering may also occur from vehicle defects or naturally occurring phenomena (e.g., fog on a camera lens). For example, an ultrasonic sensor may be naturally iced over in cold weather, or may be tampered with using tape or some other material to cover the sensor. Similarly, a switch to temporarily disable a warning system may be shorted because of a real manufacturing or installation defect, or the driver may do so the switch mechanism to produce the same result.

System Overview

FIG. 1 illustrates an overview of a tampering detection system 100 in accordance with an embodiment. In this example embodiment, vehicles 110, such as trucks and cars, and particularly fleet vehicles 112, may be configured with an event detection and reporting system 200 (see FIG. 2A), which may be an in-vehicle computing system that generates actual data relating to driving and vehicle events that may be of interest to a fleet manager or other user. Such a system 200 may include for example a Lane Departure Warning (LDW) system 222 (FIG. 2A) that may generate signals indicative of an actual lane departure, such as lane wandering or crossing. Additionally, secondary systems to be described in greater detail below with reference to FIG. 2A may be carried by the vehicles or installed in the vehicle systems, include one or more video cameras, radar, lidar, transmission, engine, tire pressure monitoring and braking systems, for example, may generate additional safety event data and driver behavior data. Front facing cameras, radar and lidar-based system may also be used to provide data relating to driver behavior in the context of following distance, headway time, response to speed signs, and anticipation of needed slowing.

With continued reference to FIG. 1, event data 120 may be selectively sent via communication links 122 to network servers 132 of one or more service providers 130. Communication service providers 130 may utilize servers 132 (only one shown for ease of illustration) that collect data 120 provided by the vehicles 112.

One or more servers 140 of the tampering detection system 100 may be configured to selectively download, receive, or otherwise retrieve data either directly from the vehicles 112 via the service providers 130 or from collection servers 132 which may be third party servers from one or more various telematics suppliers or cellular providers. Servers 140 may be configured to initiate processing of the event data in manners to be described in greater detail below.

A web application 142 executable on the one or more servers 140 of the tampering detection system 100 may include a dynamic graphical user interface for fleet managers 160 and administrators 162 to view all the information once it is processed. The tampering detection system 100 of the example embodiment may also include one or more databases 150 configured to selectively store all event information provided from the vehicles 112 in the fleet 110 for one or more designated time intervals, including raw and post-processed trip data.

In accordance with the example embodiment, the system administrators 162 may be users who are provided with interfaces to configure and manage fleets, monitor platform performance, view alerts issued by the platform, and view driver and event data and subsequent processing logs and/or views. Fleet managers 160 may view event information for their respective fleet for internal processing. These events may arrive via user-initiated reports 170 in the web application 142 executable on the one or more servers 140, or via email or other notifications 172. Fleet managers 160 may, depending on internal policies and processes or for other reasons, also interface with individual drivers 164 regarding performance goals, corrections, reports, or coaching.

Figure 2A:
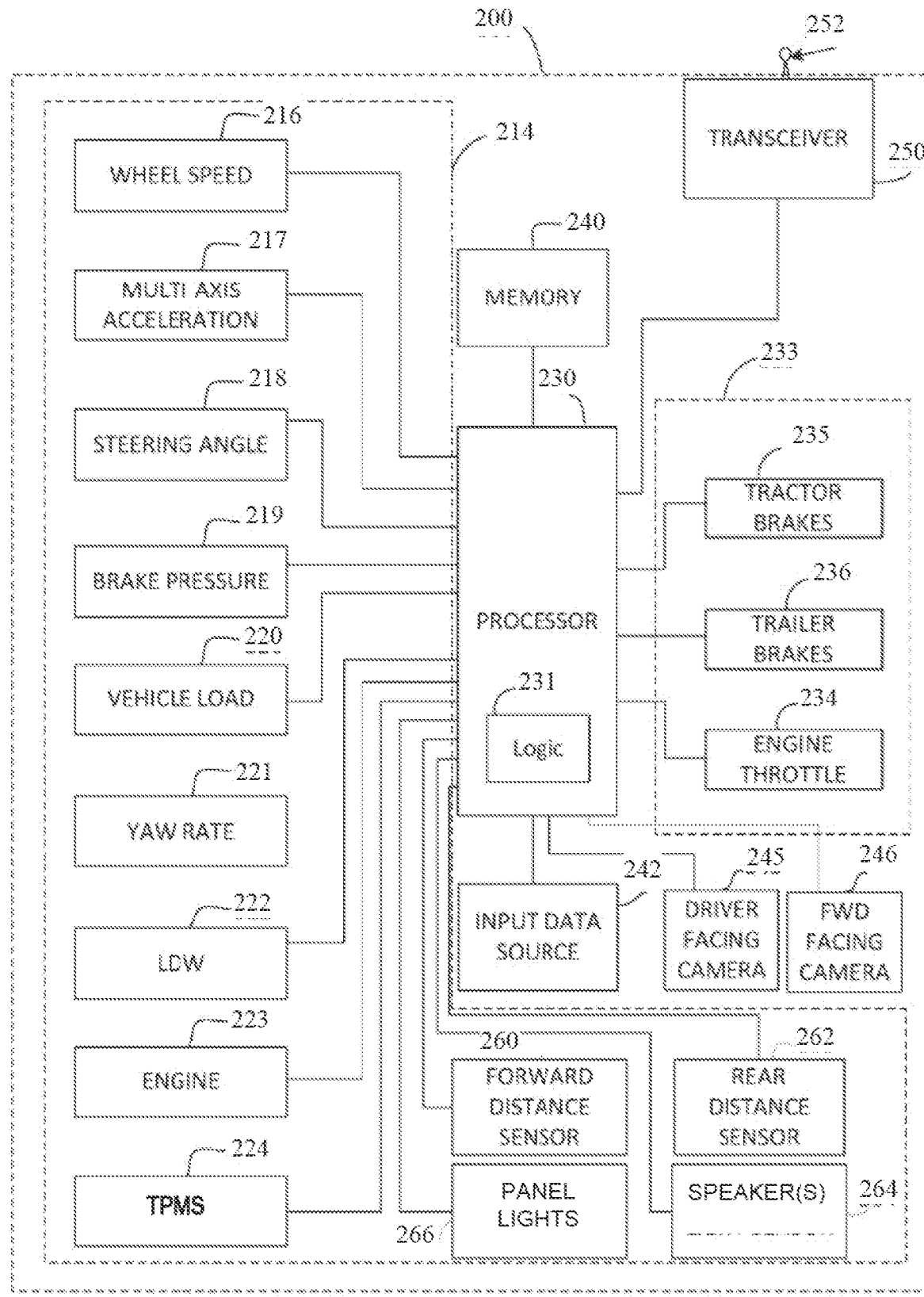
FIGS. 2A and 2B are block diagrams illustrating an embodiment of a vehicle-based computer system in accordance with an embodiment of the present subject matter.

Referring now to FIG. 2A, depicted is a schematic block diagram that illustrates details of an event detection and reporting system mentioned above, and which is configured to be used in accordance with an embodiment of the present subject matter. As further detailed below, the in-vehicle event detection and reporting system 200 may be adapted to detect a variety of operational parameters and conditions of the vehicle 112 and the driver's interaction therewith and, based thereon, to determine if a driving or vehicle event has occurred (e.g., if one or more operational parameter/condition thresholds has been exceeded). Data related to detected events (i.e., event data) may then be stored and/or transmitted to a remote location/server, as described in more detail below.

The event detection and reporting system 200 of FIG. 2A may include one or more devices or systems 214 for providing input data indicative of one or more operating parameters or one or more conditions of a commercial vehicle 112. Alternatively, the event detection and reporting system 200 may include a signal interface for receiving signals from the one or more devices or systems 214, which may be configured separate from system 200. For example, the devices 214 may be one or more sensors, such as but not limited to, one or more wheel speed sensors 216, one or more acceleration sensors/accelerometers, such as multi-axis acceleration sensors 217, a steering angle sensor 218, a brake pressure sensor 219, one or more vehicle load sensors 220, a yaw rate sensor 221, a lane departure warning (LDW) sensor or system 222, one or more engine speed or condition sensors 223, and a tire pressure (TPMS) monitoring system 224. The event detection and reporting system 200 may also utilize additional devices or sensors in the exemplary embodiment including for example a forward distance sensor 260 and a rear distance sensor 262 (e.g., radar, lidar, etc.). Other sensors and/or actuators or power generation devices or combinations thereof may be used of otherwise provided as well, and one or more devices or sensors may be combined into a single unit as may be necessary and/or desired.

The event detection and reporting system 200 may also include instrument panel lights 266 and speaker(s) 264, which may be usable to provide headway time/safe following distance warnings, lane departure warnings, and warnings relating to braking and or obstacle avoidance events.

The event detection and reporting system 200 may also include a logic applying arrangement such as a controller or processor 230 and control logic 231, in communication with the one or more devices or systems 214. The processor 230 may include one or more inputs for receiving input data from the devices or systems 214. The processor 230 may be adapted to process the input data and compare the raw or processed input data to one or more stored threshold values or desired averages, or to process the input data and compare the raw or processed input data to one or more circumstance-dependent desired value. The processor's 230 role may be to process input and outputs regarding safety, warning, or indication systems of the vehicle 112 and may be distinct from other onboard vehicle 112 processors that perform tasks such as controlling the ignition timing, obtaining measurements from a mass airflow sensor (MAF), pulsing fuel injectors, and the like. Processor 230 may communicate with other vehicle 112 processors via a vehicle data bus, such as a Controller Area Network (CAN bus), for example.

The processor 230 may also include one or more outputs for delivering a control signal to one or more vehicle systems 233 based on the comparison. The control signal may instruct the systems 233 to provide one or more types of driver assistance warnings (e.g., warnings relating to braking and or obstacle avoidance events) and/or to intervene in the operation of the vehicle 112 to initiate corrective action. For example, the processor 230 may generate and send the control signal to an engine electronic control unit or an actuating device to reduce the engine throttle 234 and slow the vehicle 112 down. Further, the processor 230 may send the control signal to one or more vehicle brake systems 235, 236 to selectively engage the brakes (e.g., a differential braking operation). A variety of corrective actions may be possible and multiple corrective actions may be initiated at the same time.

The event detection and reporting system 200 may also include a memory portion 240 for storing and accessing system information, such as for example, the system control logic 231. The memory portion 240, however, may be separate from the processor 230. The sensors 214 and processor 230 may be part of a pre-existing system or use components of a pre-existing system.

The event detection and reporting system 200 may also include a source of input data 242 indicative of a configuration/condition of a commercial vehicle 112. The processor 230 may sense or estimate the configuration/condition of the vehicle 112 based on the input data, and may select a control tuning mode or sensitivity based on the vehicle configuration/condition. The processor 230 may compare the operational data received from the sensors or systems 214 to the information provided by the tuning.

In addition, the event detection and reporting system 200 may be operatively coupled with one or more driver-facing imaging devices, shown in the example embodiment for simplicity and ease of illustration as a single driver facing camera 245 that may be trained on the driver and/or trained on the interior of the cab of the commercial vehicle 112. However, it should be appreciated that one or more physical video cameras may be disposed on the vehicle 112 such as, for example, a video camera on each corner of the vehicle 112, one or more cameras mounted remotely and in operative communication with the event detection and reporting system 200 such as a forward-facing camera 246 to record images of the roadway ahead of the vehicle 112. In the example embodiments, driver data may be collected directly using the driver facing camera 245 in accordance with a detected driver head position, hand position, or the like, within the vehicle being operated by the driver. In addition, driver identity may be determined based on facial recognition technology and/or body/posture template matching.

The event detection and reporting system 200 may also include a transmitter/receiver (transceiver) module 250 such as, for example, a radio frequency (RF) transmitter including one or more antennas 252 for wireless communication of the automated control requests, GPS data, one or more various vehicle configuration and/or condition data, or the like between the vehicles and one or more destinations such as, for example, to one or more services (not shown) having a corresponding receiver and antenna. In an example, transceiver may communicate cellularly using its antenna 252 over a cellular telephone network with a cloud-based computing system. The cloud computing system may be implemented, for example, by one or more servers 140, and/or servers 132. The transmitter/receiver (transceiver) module 250 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 230 may be operative to combine selected ones of the collected signals from the sensor systems described above into processed data representative of higher-level vehicle condition data such as, for example, data from the multi-axis acceleration sensors 217 may be combined with the data from the steering angle sensor 218 to determine excessive curve speed event data. Other hybrid event data relatable to the vehicle 112 and driver of the vehicle 112 and obtainable from combining one or more selected raw data items from the sensors includes, for example and without limitation, excessive braking event data, excessive curve speed event data, lane departure warning event data, excessive lane departure event data, lane change without turn signal event data, loss of video tracking (LOVT) event data, LDW system disabled event data, distance alert event data, forward collision warning event data, haptic warning event data, collision mitigation braking event data, ATC event data, ESP event data, RSP event data, ABS event data, TPMS event data, engine system event data, average following distance event data, average fuel consumption event data, average ACC usage event data, and late speed adaptation (such as that given by signage or exiting).

The event detection and reporting system 200 of FIG. 2A may be suitable for executing embodiments of one or more software systems or modules that perform vehicle brake strategies and vehicle braking control methods according to the subject application. The example event detection and reporting system 200 may include a bus or other communication mechanism for communicating information, and a processor 230 coupled with the bus for processing information. The computer system includes a main memory 240, such as random-access memory (RAM) or other dynamic storage device for storing instructions and loaded portions of the trained neural network to be executed by the processor 230, and read only memory (ROM) or other static storage device for storing other static information and instructions for the processor 230. Other storage devices may also suitably be provided for storing information and instructions as necessary or desired.

Instructions may be read into the main memory 240 from another computer-readable medium, such as another storage device of via the transceiver 250. Execution of the sequences of instructions contained in main memory 240 may cause the processor 230 to perform the process steps described herein. In an alternative implementation, hard-wired circuitry may be used in place of or in combination with software instructions to implement the present subject matter. Thus, implementations of the example embodiments are not limited to any specific combination of hardware circuitry and software.

Figure 2B:
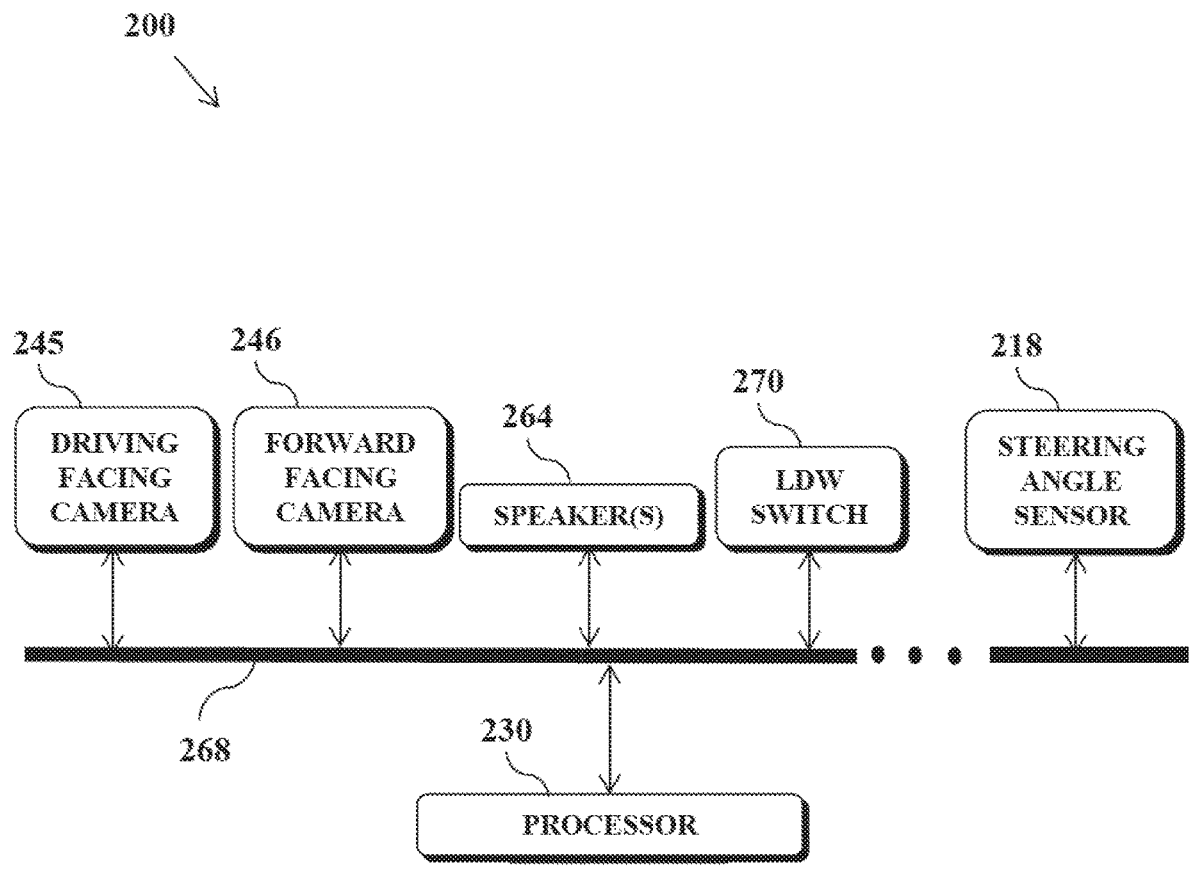

Referring now to FIG. 2B, only certain components of the event detection and reporting system 200 of FIG. 2A are depicted. As shown, various components of the system 200 are shown as being in communication with processor 230 by being connected to a vehicle bus 268, which can be a private bus dedicated to the system 200 or a general vehicle bus, CAN bus, and the like. As shown, in addition to DFC 245, FFC 246, speaker(s) 246 and steering angle sensor 218, an LDW switch 270 may also be shown as being in communication with processor 230 via bus 268. LDW switch 270 may be a component provided in the interior of a vehicle by which the driver can legitimately switch off the LDW system 222 on a temporary basis. This functionality may be provided so that drivers 164 can temporarily avoid receiving repeated unwarranted warnings due to certain unusual road conditions, such as passing through a construction area where lanes are significantly narrowed, rendering it impossible or very difficult to otherwise setting off the LDW system 222.

Referring to the components of FIG. 2B by way of example only, a driver 164 may attempt to tamper with one or more of the depicted components, as described above. Because of this tampering, the event detection and reporting system 200 may then generate a specific diagnostic trouble code (DTC). Specifically, processor 230 may read and/or generate DTCs based on the malfunction of the attached systems and sensors connected via the vehicle bus(es) shown in FIGS. 2A and 2B, for example. Processor 230 may also generate DTCs based on detected faults of its own, such as when it fails to read/write to/from a memory such as memory 240, an external memory card, or a memory-mapped I/O device, such as a display. In one example, the processor 230 may read DTCs, decode the DTCs, and transmit them using the transceiver 250 via a cellular connection to servers 132, servers 140, or a cloud-based system.

Figure 3:
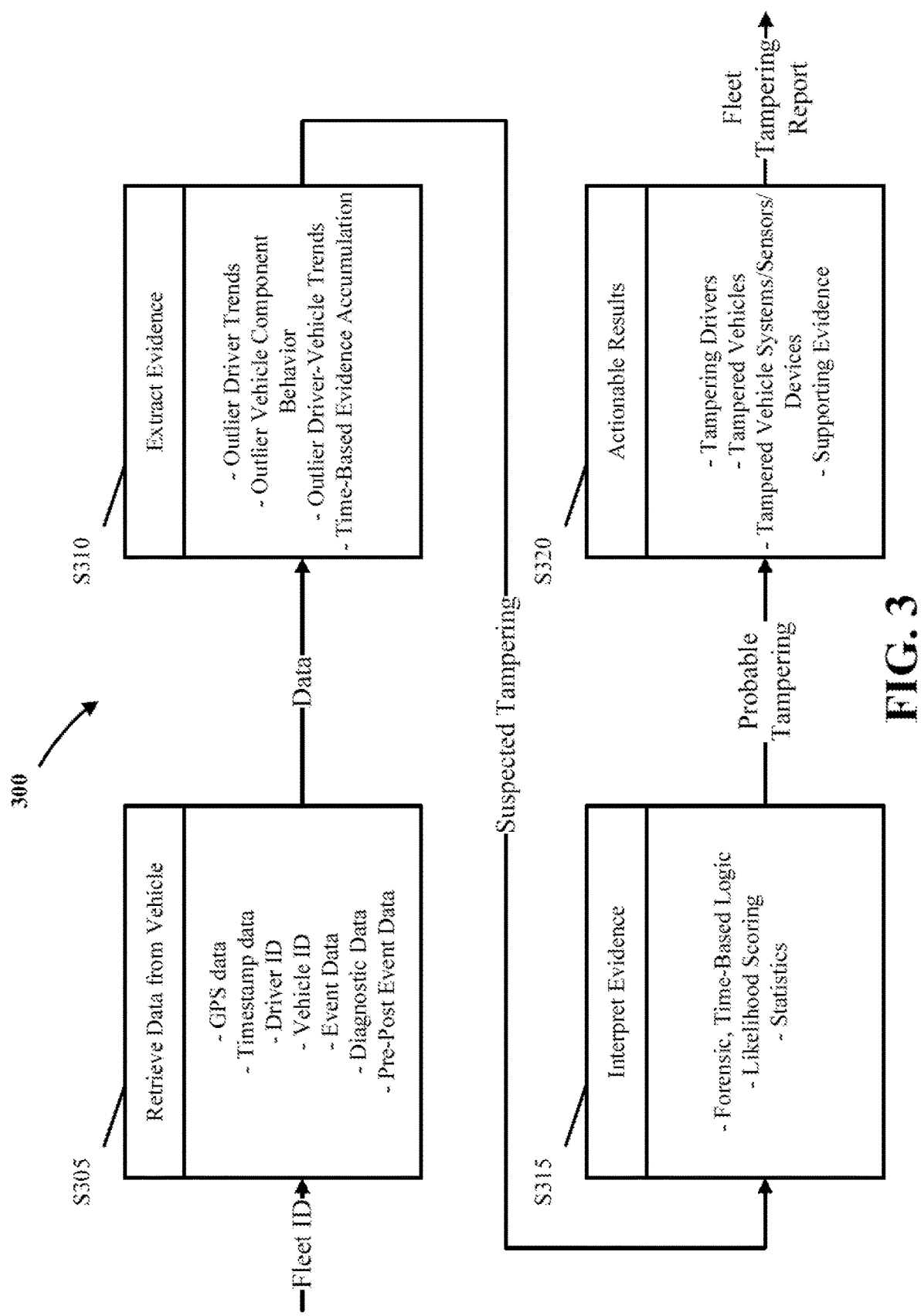
FIG. 3 is a flow showing a process to identify drivers suspected of tampering in accordance with an embodiment of the present subject matter.

FIG. 3 illustrates a flow of in accordance with a method 300 according to the present subject matter, which may be carried out by the tampering detection system. As used herein, the tampering detection system 100 may refer to a combination of components shown in FIG. 1, such as one or more servers 140 of the tampering detection system 100, and/or system database 150, and/or the in-vehicle event detection and reporting system 200. The systems operating in conjunction with a vehicle 112 may produce Diagnostic Trouble Codes (DTCs) both when tampered with and for other "normal" routine reasons, such as inevitable wear and tear, and/or vehicle system changes, as previously described. In a step S305, vehicle data may be collected from a vehicle 112. The data may be collected via wireless transmission using transceiver 250 of system 200. The data may be obtained by processor 230 and stored in a memory, such as memory 240. The data may include, for example, GPS data, timestamp data, a driver ID, a vehicle ID, event data, DTCs or other diagnostic data, and pre-post event data. Data may be collected as part of a scheduled reporting period or in response to an inquiry from a user such as a fleet manager 160. The data may be further processed in S310 where outlier driver trends, outlier vehicle component behavior, outlier driver-vehicle trends, and time-based evidence accumulation may be extracted. The processing in S310 may produce data including a list of drivers 164 that are suspected to be tampering and a list of vehicles 112 that are suspected of being tampered with. This data may be further interpreted in S315 using forensic, time-based logic techniques, likelihood scoring, and statistical techniques to further distinguish the drivers 164 that are more likely to be tampering and the vehicles 112 more likely being tampered with. One or more tests to be subsequently described may be applied to the data collected in S305 to identify patterns that may indicate tampering. Each test may be considered optional, depending on the choice of the system administrator 162 and fleet manager 160. A first test may include identifying patterns that include significant deviations from an average, or a normal, "benign" DTC behavior of a vehicle 112. A second test may analyze patterns that include deviations and DTCs that may favor a driver during longer trips where tampering may of greater benefit. A third test may analyze patterns of DTCs that occur at certain times and "follow" the driver 164 across multiple distinct vehicles 112. These patterns may rely on statistic and/or reconstruction-based approaches by accumulating evidence from a variety of sources. The tampering detection tests may be performed optionally, in any order, or sequentially to achieve a coarse-to-fine testing methodology, where additional data may be evaluated with greater granularity may be evaluated with each subsequent test. In S320, the method 300 may provide results in the form of a list of likely tampering drivers 164, likely vehicles 112 that have been tampered with, likely systems, sensors, and/or devices that have been tampered with, and a list of evidence that supports these findings. The results generated in S320 may be in the form of a textual story, a timeline, and/or a fleet tampering report that can be understood and interpreted by a fleet manager 160 or system administrator 162, for example.

Binomial Distribution Test

A first "binomial distribution test" may detect tampering based on the assumption that vehicles 112 randomly produce benign DTCs not caused by tampering. Accordingly, these DTCs may be viewed as "background noise" in the context of assessing whether a vehicle's systems are being tampered with. Assuming the presence of DTCs may be a binary, Boolean output, a binomial distribution representing the probability of a benign DTC occurring may be used as a model. To create this model, a probability of occurrence (i.e., success) of one or more DTCs taking place per base unit (e.g., per trip, per mile, per minute, etc.) may be computed based on a population dataset. The population dataset may be sourced from a vehicle manufacturer, experimental DTC historical data observed from similar and/or identical vehicles, and the like. Each base unit may be treated as an independent Bernoulli trial, where each trial may have a probability $\pi$ of occurrence.

A probability may be calculated for a driver 164 to have incurred as many DTCs per base unit as are observed. For example, where the base unit is per mile, the probability may be calculated based on the population "success" probability of a DTC based on the distance traveled. If the calculated probability of a DTC for the given distance is too low, meaning that too many DTCs occurred based on the distance traveled, the driver 164 may be identified as a suspected tamperer. For example, if the probability for a single DTC to occur in a given vehicle 112 while traveling ten miles is 1%, yet six DTCs occur for that driver 164 while traveling ten miles, then the odds may suggest that the DTCs were caused by tampering with one or more vehicle systems. Since an average rate of benign DTCs may be used, the first tampering detection test may be the least sensitive for detecting tampering. This may be due in-part at least to the dilution effect involved in averaging. The following formula may be utilized to calculate a probability P(x) of observing x trips, miles, or minutes with one or more DTCs:

$$P(x) = \frac{N!}{x!(N-x)!}\pi^x(1-\pi)^{N-x}$$

where N may be a total quantity of trips, miles, or minutes, and where $\pi$ may be the probability of occurrence (success) of one or more DTCs per trip, mile, or minute, as previously discussed.

In applying this formula, all base units should be kept consistent, whether using trip, mile, minute, or any other base unit. For instance, it may be assumed that $\pi=0.1$ may be the probability of occurrence of that a DTC will occur for each mile. If the driver 164 travels a total of 100 miles, the probability that the driver experiences one or more DTCs over a 90-mile portion of the total 100 miles driven may be computed by substituting these values into the aforementioned formula as shown:

$$P(90) = \frac{100!}{90!10!}(0.1)^{90}(0.9)^{10} = 6*10^{-78} \approx 0$$

It may be seen that the probability P(x) of experiencing one or more DTCs over a 90-mile interval of a 100-mile trip on a normal, non-tampered vehicle may be essentially 0. Because the probability of experiencing one or more DTCs over this interval is so unlikely, a driver 164 that experiences one or more DTCs during this trip would be a suspected tamperer. However, in closer, more debatable cases where the probability of experiencing one or more DTCs may be higher, a probable tampering threshold could be set to programmatically check whether a driver 164 may be likely to be tampering with the vehicle systems. In one example, the probable tampering threshold may be 0.6 such that a probability P(x) that may be less than or equal to 0.6 may cause the tampering detection system 100 to programmatically identify a suspected tamperer.

Alternatively, or in addition, a similar approach to calculating a probability or score of tampering may be determined for drivers 164. In this approach, it may be assumed that vehicles 112, depending on the maintenance state of their machinery, may produce DTCs at different rates and with different patterns. The average DTC rates for each vehicle 112 may be calculated per trip, per distance, per time, or the like, as in the binomial method previously discussed. The deviation of the trip/distance/time from the computed average DTC rate for a vehicle 112 being operated may be considered, and the trip/distance/time may have a probabilistic label assigned to it, e.g., "a trip with 80% likelihood of tampering." For instance, if the average distance between DTCs is ten miles with a standard deviation of two miles for a vehicle 112 being operated, a tampering probability derived from the average standard deviation may be assigned. These labeled trips may then be assigned to the drivers 164 that produced them.

An aggregate probability of tampering may be produced with weighting such that longer trips may contribute more to the calculated tampering probability than shorter trips for each driver 164. The aggregation may be performed irrespective of vehicle 112. For example, all trips for a driver 164 over the last month while operating any number of vehicles may be aggregated to calculate an aggregated probability of tampering. In this example approach, each vehicle 112 that was operated by the driver 164 of interest may generate evidence of tampering. The tampering detection system 100 may retrieve the tampering evidence from each vehicle 112 for each driver 164 that operated it and examine the distribution of aggregated tampering probabilities. Where the probability of tampering may be considered an outlier when compared with other drivers 164, implausibly high, or otherwise extreme in some way, the driver 164 may be identified as a suspected tamperer.

Greedy Tamperer Test

As previously discussed, it may be assumed that drivers 164 preferentially tamper with the vehicle systems on longer trips versus shorter trips, where the benefits of tampering may be greater. These drivers may be known as "greedy tamperers." All of a driver's trips across multiple vehicles may be valuated to determine whether the tampered trips are, on average, longer than other non-tampered trips. A large difference between the average lengths of the presumably tampered trips and the non-tampered trips may confirm that tampering is indeed occurring.

A second "greedy tamperer" test may be more specific than the first tampering detection test, at least because it may not rely on averaging; rather the second test may utilize additional data and consider each trip separately. The number of expected DTCs per trip for a given vehicle 112 may be understood as a baseline DTC rate. If a baseline DTC rate for a vehicle 112 is high, this expected number of DTCs per trip may be subtracted, subject to the distance and/or duration of the trip, to eliminate the "DTC background noise" from the DTC quantity for a given trip, leaving only the additional DTCs that may be less likely to be benign and more probative of tampering.

To provide an example, suppose a driver 164 has conducted five trips, sorted from shortest to longest and numbered from one to five. It may be observed that DTCs occurred only during trips three and five. In this case, the DTCs occurred during longer trips while none occurred during the shorter trips. This may be suspicious, given that it may be expected drivers 164 that may preferentially tamper with vehicle systems on longer trips and may be less likely to tamper on shorter trips, as previously described. For this reason, it may be expected that for non-tampering drivers 164, the average rank (in terms of length) of trips without DTCs may match the ranking of trips with DTCs. Stated another way, for non-tampering drivers 164, the tendency of DTCs to occur may not become greater for longer trips. Instead, the tendency for DTCs to occur may remain the same, or at least the same per base unit (trip, distance, or time).

To detect a driver 164 tampering on longer trips, the driver's trips may be sorted by length. The tampering detection system 100 may attempt to identify pattern of more frequent DTCs for long trips than for short trips. A Mann-Whitney nonparametric statistic may be utilized to calculate a probability of the observed pattern occurring. If the probability is too low, the driver 164 may be identified as a suspected tamperer. This second tampering detection test may be more specific by exploiting data on a more granular scale without merely averaging it together as in the binomial approach of the first tampering detection test.

An example of how the second tampering detection test may be applied is described as follows. It may be assumed that a given driver 164 has conducted nine trips, sorted from shortest to longest and numbered from one to nine. Of these nine trips, it may be observed that DTCs have occurred in trips four, five, seven, and nine, while no DTCs have occurred during trips one, two, three, six, and eight. To determine the probability of observing this ordering, the sum of the ranks for the five trips where DTCs did not occur is 20, while the sum of the ranks for the four trips where DTCs did occur is 25. The U-statistic may be given by the smaller of the following two formulas:

$$20-(5*6/2)=5 \text{ and } 25-(4*5/2)=15$$

From this formula, it may be seen that U=5. By consulting a critical value Table, 1 may be the critical value (one-tailed test with significance level 0.025), which 5 exceeds, and so tampering may be suspected. Selecting a different significance level may change this result. Therefore, this second tampering detection test may attempt to detect tampering based on identifying longer trips having more DTC occurrences than shorter trips.

In another example, a hypothetical driver 164 has completed 18 trips, where tampering may be suspected to have occurred during the longest trip. The trips may be ranked in order, with 1 to 17 being untampered and trip 18 on which tampering is presumed to have occurred. If the presumed tampering is the result of chance or a defective vehicle 112, then the average of the presumably tampered ranks and the untampered ranks should be similar, preferably somewhere near the middle. The central rank values of the untampered trips and the tampered trip may be compared to produce a probability that tampering occurred. The statistical Mann-Whitney test, referred to earlier, may take two groups of data, A and B, for example, combines them into a single resulting group, sorts the resulting group from smallest to largest, ranks the sorted group, and compares the average ranks given to A and to B. In the example, an average rank of 9 (the central value for all integers between 1 and 17) may be computed for the non-tampered group, and 18 for the presumably tampered one. The average expected summed rank can be computed as follows:

$$18*(18+1)/2=171$$

and the sum of 1 to 17 is 153.
The Mann-Whitney U-statistic is then:

$$171-153=18$$

Consulting a table for the critical values of U, with a sample size of 18, and using a confidence level of 95%, it may be seen that the null hypothesis may be rejected and that groups A and B are from different distributions, i.e. tampering has likely happened.

As previously discussed, the second tampering detection test may evaluate the duration of the trips alone and not the specific details of precisely when the DTCs occurred during a trip. A tampering driver 164 may achieve the maximum benefit from tampering when performed early during a trip and removed or stopped prior to being detected, such as just before completing the trip. Other drivers 164 who acquire the same vehicle 112 to perform their work duties may find the vehicle 112 restored to an untampered state. Accordingly, the DTCs that may have occurred for the former tampering driver 164 may not occur for a subsequent, new, non-tampering driver. This behavior may form a pattern where DTCs appear while operating a given vehicle 112 by a tampering driver, and the DTCs suddenly cease when a different driver 164 operates the same vehicle 112. Alternatively, or in addition, the tampering detection system 100 may determine that a pattern of DTCs "follow" a given driver 164 from one vehicle 112 to the next, where each vehicle 112 operated by a given driver 164 incurs more DTCs than when the same vehicle 112 may be operated by other drivers. The tampering detection system 100 may be configured to leverage this pattern to identify tampering drivers 164. It is important to note that both DTC occurrences and DTC non-occurrences may weigh-in as evidence of tampering and non-tampering alike. The various sensors and systems illustrated in FIGS. 2A and 2B may be cross-examined and/or compared against one another to confirm whether a trip is "too good to be true." In an example, a steering angle sensor 218 may generate data during a trip that indicates the steering wheel was not moved from a neutral position or moved only very slightly from a neutral position, while video from a forward-facing camera 246 may reveal that the vehicle 112 made several sharp turns. This type of data inconsistency, while not necessarily generating a DTC, may nevertheless be indicative of tampering. More generally, sensors and systems may also be cross-examined and/or compared against one another to determine whether one sensor/system is misreporting data, which may weigh against evidence of tampering in some instances. Evaluating the patterns of DTCs to ascertain what may be "normal" for a driver 164 and "normal" for a given vehicle 112 may help to distinguish tampering drivers 164 from non-tampering drivers 164.

Finite State Machine Evidence Collection Framework for Tampering Detection

A third tampering detection test may be more specific than the first and second tampering detection tests at least because it may more precisely evaluate when DTCs occur and whether a recurring pattern exists. As commercial vehicle drivers 164 may often share vehicles 112, the benign DTCs previously discussed may be expected to occur as a function of the vehicle 112 rather than the operating driver. A finite state machine (FSM) may be implemented to evaluate when a probable tampering-related (non-benign) DTC occurs. The FSM may be implemented to execute on a processor disposed within the vehicle 112, on one or more system servers 140, or a cloud-based computing system. An FSM may describe a plurality of different states of a system and the rules that govern moving from one state to the next. The FSM may remain in a given state or transition to additional states when a transition rule may be satisfied. The third tampering detection test may attempt to detect tampering based on DTCs that occur at precise times, such as approximately at the trip start or trip end, whether the DTCs recur in patterns, and the number of times that DTCs occur. A scoring scheme may accumulate evidence that tampering is occurring. For example, those drivers 164 having excessively large numbers of points when compared with their peers across multiple vehicles may be identified as suspected tamperers. As the "DTC background noise" may also cause transitions between the states of the FSM, the tampering detection system 100 may attempt to detect tampering based on excessive numbers of transitions or points. Weights may be assigned to each transition of the state machine, where higher weighting equates to a higher probative value of tampering. This subject is subsequently discussed with respect to the determination of the weighted_transition_ score. The weights may be optimized over time based on feedback that indicates whether a suspected tamperer was correctly identified.

Figure 4:
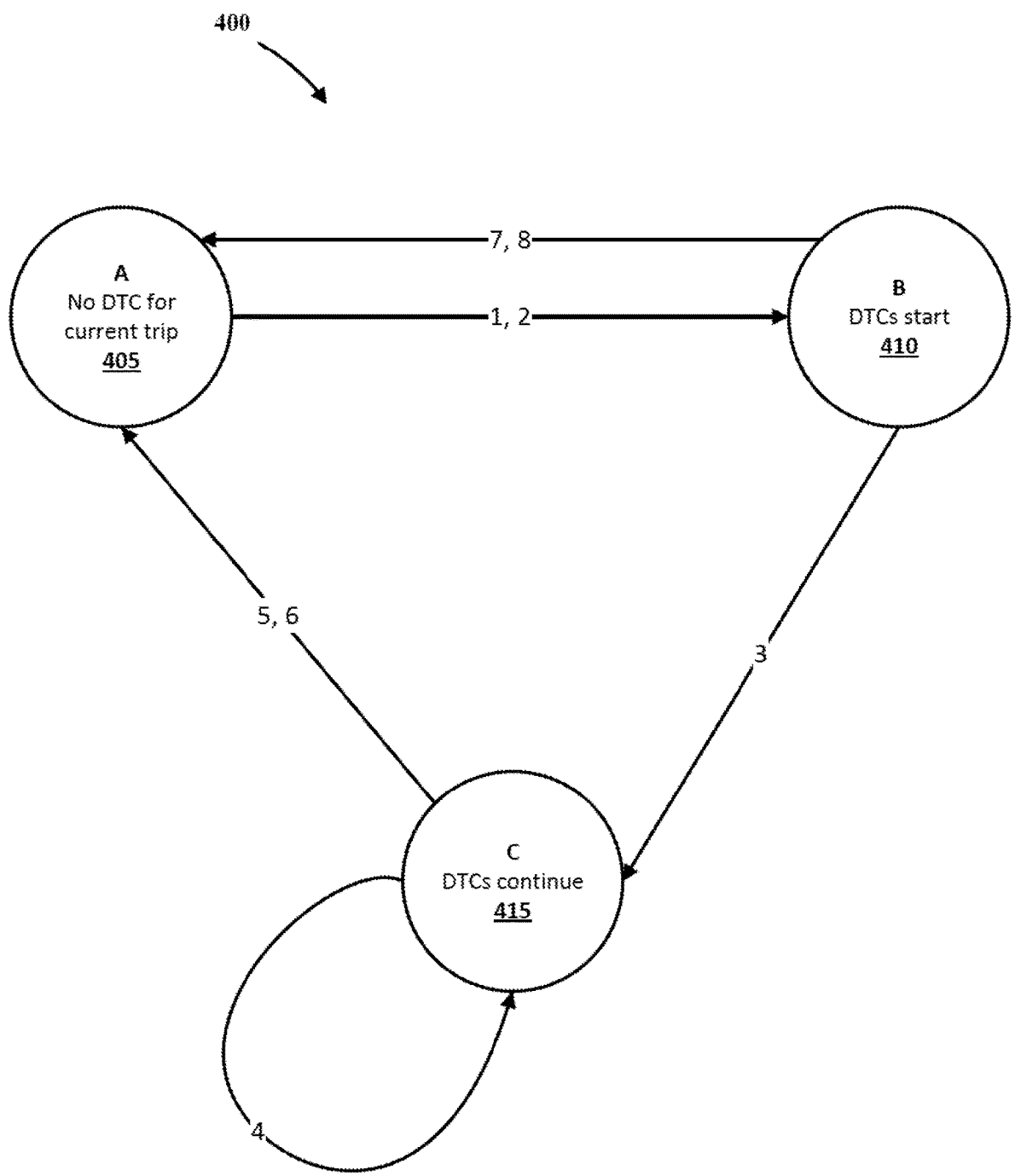
FIG. 4 is a state diagram of a finite state machine to perform a tampering detection test in accordance with an embodiment of the present subject matter.

FIG. 4 illustrates a state diagram 400 in accordance with the FSM of the third tampering detection test. Evidence of tampering may be accumulated when DTCs start appearing for a "new" driver 164 who begins using a vehicle 112. Alternatively, or in addition, DTCs may appear near the beginning of a trip or perhaps sometime later during the trip and then suddenly cease when the driver 164 transfers the vehicle 112 to another drive. The number of times that the transitions occur between states of the FSM may be tracked and accounted for.

In an example scenario, a fleet of vehicles 112 may exist where none of the vehicles 112 may be exhibiting problems, such that no DTCs are being generated for any of the drivers 164 while operating the vehicles 112. A new driver, "Jones," then begins using a vehicle X, which is one of the vehicles 112 of the fleet. DTCs begin appearing during Jones's trips, particularly during the early portion of Jones's trips, such as within the first 33% of the trip, first 25% of the trip, first 10% of the trip, and the like, where DTCs occurring earlier in the trip weigh more heavily in favor of tampering. The vehicle system 200 further reports that the DTCs cease when Jones ends his trip, and a new driver begins operating the vehicle. Further data received by the onboard system 200 of other vehicles 112 of the fleet demonstrate that DTCs occur in each fleet vehicle 112 driven by Jones but do not occur while being operated by any other driver. In this example scenario, data evidence exists to show (1) a same driver, Jones, operates multiple fleet vehicles and DTCs begin to occur from the time he takes possession of the vehicles; (2) the same fleet vehicles 112, when used by drivers other than Jones, do not generate DTCs; and (3) the DTCs appear to occur primarily during the early portion of Jones's trips rather than later during those same trips.

In another example, a first driver "X" may begin operating a given vehicle 112 and travel one mile before stopping at an unscheduled, off-road, and/or otherwise unusual location. While at the location, a DTC may be generated, after which the driver "X" may continue the scheduled trip. Fast-forward to near the end of the trip, either in terms of time or distance, a safety-system warning such as an LDW, for example, may be generated. The LDW may occur for the first time since the driver "X" of the given vehicle 112 made the initial stop after traveling one mile. When a different, subsequent driver "Y" begins operating the vehicle 112, it may be observed that the subsequent driver "Y" causes the LDW to be generated in accordance with a known, "normal" pattern for the subsequent driver "Y." The tampering detection system 100 may record the LDWs generated for both the first driver "X" and the subsequent driver "Y." The FSM may be used to determine when the system(s) of the given vehicle 112 were tampered with and when it was restored.

The FSM may be utilized to: identify tampering-related DTCs associated with each driver, to record when the DTCs start and stop according to associated timestamp data, to identify the driver 164 of the vehicle 112 via an associated driver ID, to identify when the driver 164 had possession of the vehicle 112 and was operating the vehicle 112, to identify where the driver 164 traveled with the vehicle 112 using GPS data, to identify the vehicle speed using wheel speed data 216, including the speed of the vehicle when each of one or more DTCs occurred, and to identify the distance the vehicle 112 had traveled when each of one or more DTCs occurred. The FSM may collect these forms of evidence in conjunction with three vehicle states. The FSM states are provided in Table 1. The transition rules between them are provided in Table 2 along with counter operations in parenthesis. In addition to the states and transitions, the tampering detection system 100 may also log the drivers by driver ID and the timestamps when the transitions between states occur, as previously discussed. Six counters are described in Table 3 and may be incremented and/or decremented in accordance with the transitions between states. Alternatively, or in addition, the data logged by counters shown in Table 3 may be implemented in the form of a list.

TABLE 1

| State | Description |
| --- | --- |
| A 405 | No DTC for current trip. |
| B 410 | DTCs start |
| C 415 | DTCs continue |

TABLE 2

| Transition | States | Description |
| --- | --- | --- |
| 1 | A to B | For a given vehicle, a new trip starts with the same driver as the last trip on the vehicle. The new trip has one or more DTCs. The previous trip had no DTCs for the same driver. (Start Driver += 1; Dist Driver += TripLength) |
| 2 | A to B | For a given vehicle, a new trip starts with a new driver. The new trip has one or more DTCs. The previous trip had no DTCs for the previous driver. (Start Driver +=1; Dist Driver += TripLength; Greedy Driver +=1) |
| 3 | B to C | A new trip starts with the same driver as the last trip on the vehicle. The previous trip had at one or more DTCs. The new trip has one or more DTCs. (Continued Driver += 1, Dist Driver += TripLength) |
| 4 | C to C | A new trip starts with the same driver as the last trip on the vehicle. The previous trip had one or more DTCs. The new trip has one or more DTCs. (Continued Driver += 1; Dist Driver += TripLength) |

TABLE 2-continued

| Transition | States | Description |
|---|---|---|
| 5 | C to A | A new trip starts with no DTCs. The previous trip had one or more DTCs. A driver change took place between the trips. (Stop New Driver += 1) |
| 6 | C to A | A new trip starts with no DTCs. The previous trip had one or more DTCs. Both trips had the same driver. (Stop Same Driver += 1) |
| 7 | B to A | A new trip starts with no DTCs. The previous trip had one or more DTCs. A driver change took place between the trips. (Stop New Driver += 1) |
| 8 | B to A | A new trip starts with no DTCs. The previous trip had one or more DTCs. Both trips had the same driver. (Stop Same Driver += 1) |

TABLE 3

| Counter/List Element | Description |
|---|---|
| Start Driver | number of times DTCs started when a new driver started |
| Dist Driver | distance traveled with DTCs |
| Greedy Driver | number of times DTCs started and stopped with the same driver for a contiguous series of trips by that driver |
| Continued Driver | number of times that DTCs continued for a given driver |
| Stop New Driver | number of times that DTCs stopped when a new driver took over |
| Stop Same Driver | number of times that DTCs stopped when the same driver continued |

The suspicion or likelihood of tampering may be increased when any of the six counters listed in Table 3 increase, especially across multiple vehicles 112. One counter that may be more sensitive to tampering may be the Greedy Driver, which may increment each time all the trips in one or more contiguous sequences for a given driver 164 were stated by and stopped by that driver 164. In an example, it may be suspicious where a same driver 164 conducts multiple contiguous trips where DTCs occur but no DTCs occur for the drivers conducting trips before and after those contiguous trips.

Figure 5:
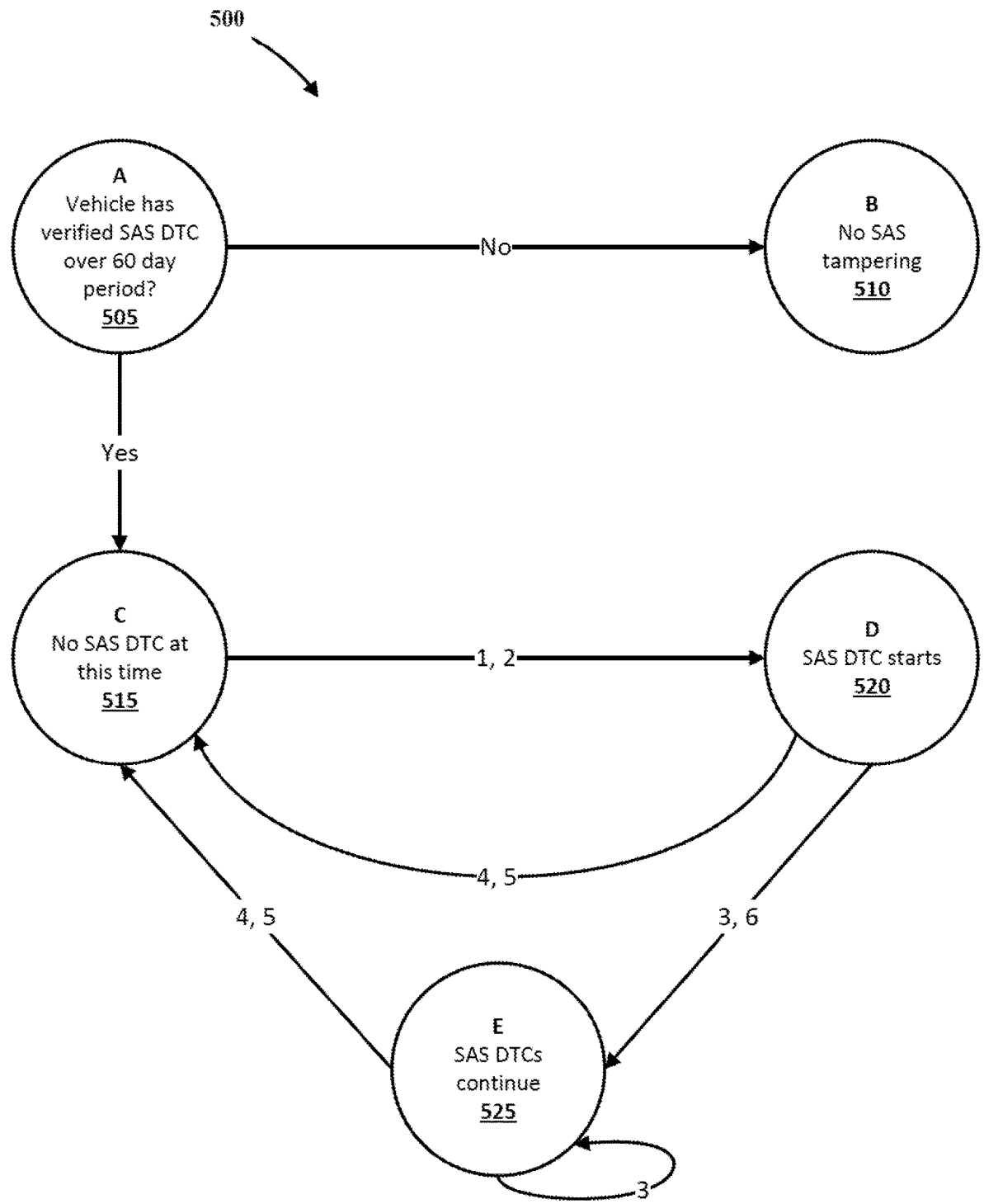
FIG. 5 is a state diagram of a finite state machine to detect tampering with a steering angle sensor according to an embodiment of the present subject matter

FIG. 5 illustrates an example state diagram 500 for detecting tampering with a Steering Angle Sensor (SAS) in accordance with the FSM of the third tampering detection test. Other types of tampering with other vehicle systems and sensors may be analyzed using a similar framework. Five states are provided in the example embodiment shown in Table 4. The transition rules between them are provided in Table 5 along with counter operations in parenthesis. The same counters/list described with reference to FIG. 4 are used with reference to FIG. 5 and may be incremented and/or decremented in accordance with the transitions between states.

As shown in FIG. 5, an FSM may be implemented in accordance with state diagram 500 and may begin where 60 days of vehicle data may be evaluated. The trip start and trip end events may be selected along with any DTC events. The trip and DTC events may be sorted according to associated timestamp data in ascending chronological order. The sorted event data for each vehicle 112 may be input to the FSM according to FIG. 5, which may label and log the states and transitions between the states for each vehicle 112 based on Tables 4-6 which follow.

TABLE 4

| State | Description |
|---|---|
| A (start) 505 | Check if vehicle has verified SAS DTC over last 60 day period. |
| B (end) 510 | No SAS tampering possible. |
| C 515 | No SAS DTC currently. |
| D 520 | SAS DTC starts. |
| E 525 | SAS DTCs continue. |

In state A (505) of state diagram 500, the FSM may check if a vehicle 112 has had any suspicious DTCs over the prior 60 days. If not, no relevant evidence may be deemed to exist, so FSM may transition to state B (510), which ends the process for that vehicle 112. On the other hand, if the vehicle 112 has exhibited verified DTCs over the prior 60 days, the FSM may move to state C (515). Table 5 may describe each of the transitions that the FSM may make once the vehicle 112 is determined to have had exhibited relevant DTCs.

TABLE 5

| Transition | States | Description |
|---|---|---|
| 1 | C to D | For a given vehicle, a new trip starts with the same driver as the last trip on the vehicle. The new trip has one or more non-recovered SAS DTCs. The previous trip had no SAS DTCs for the same driver. (Start Driver += 1; Dist Driver += TripLength) |
| 2 | C to D | For a given vehicle, a new trip starts with a new driver. The new trip has one or more non-recovered SAS DTCs. The previous trip had no SAS DTCs for the previous driver. Start Driver += 1; Dist Driver += TripLength; Greedy Driver += 1) |
| 3 | D to E | A new trip starts and has SAS DTCs. The previous trip also had SAS DTCs. Both trips had the same driver. (Continued Driver += 1; Dist Driver += TripLength) |
| 3 | E to E | A new trip starts and has SAS DTCs. The previous trip also had SAS DTCs. Both trips had the same driver. (Continued Driver += 1; Dist Driver += TripLength) |
| 4 | D to C | A new trip starts with no SAS DTCs. The previous trip had SAS DTCs. Both trips had the same driver. (Stop Same Driver += 1) |
| 4 | E to C | A new trip starts with no SAS DTCs. The previous trip had SAS DTCs. Both trips had the same driver. (Stop Same Driver += 1) |
| 5 | D to C | A new trip starts with no SAS DTCs. The previous trip had SAS DTCs. A driver change took place between the trips. (Stop New Driver += 1) |
| 5 | E to C | A new trip starts with no SAS DTCs. The previous trip had SAS DTCs. A driver change took place between the trips. (Stop New Driver += 1) |
| 6 | D to E | A new trip starts with SAS DTCs. The previous trip had SAS DTCs. A driver change took place between the trips. |

During logging, the FSM transitions may be represented as the enumerated values in Table 6 below.

TABLE 6

| Transition Enumerated Value | Related Transitions | Description |
|---|---|---|
| SAS_Start_Driver | 1, 2, 6 | One or more SAS DTC(s) started with a new driver on a new trip. |

TABLE 6-continued

| Transition Enumerated Value | Related Transitions | Description |
| --- | --- | --- |
| SAS_Continued_Driver | 3 | One or more SAS DTC(s) continued for the same driver on a new trip. |
| SAS_Stop_New_Driver | 5 | One or more SAS DTC(s) stopped with a new driver on a new trip. |
| SAS_Stop_Same_Driver | 4 | One or more SAS DTC(s) stopped with the same driver on a new trip. |

As the states and transitions between states are logged, the transitions may also be scored. The transition scores may be accumulated into a total tampering score variable for each vehicle-driver pair. The total distance traveled may also be accumulated while suspicious activity was present, or after DTCs began occurring, on each vehicle 112 while operated by a specific driver 164. The scoring scheme will be subsequently discussed. The FSM may stop executing and collecting evidence when the input data stream is exhausted.

There may be instances where the duration and/or the distance of suspicious activity may be obscured by a tampering driver 164 that unplugs a vehicle safety sensor on a trip, for example. Doing so may yield one or more DTCs on the vehicle bus (e.g., CAN bus) for that trip. The event detection and reporting system 200, more specifically, processor 230, may transmit the DTC data to the servers 140 or cloud-based computing system. The tampering driver 164 may subsequently shut off the vehicle 112 with the safety sensor left unplugged. Shutting off the vehicle 112 may simultaneously turn off the ignition, which may signal an "end trip" event for the event detection and reporting system 200. The tampering driver 164 may then restart the vehicle 112, signaling a new "trip start" event on the event detection and reporting system 200. During the new trip, however, the DTC generated by the unplugged vehicle safety sensor may not be captured or it may not be generated on the vehicle bus under certain software configurations because it may appear as a redundant DTC that has already been transmitted by the event detection and reporting system 200 to the servers 140 and/or cloud-based system. Therefore, the event detection and reporting system 200 may not necessarily be able to accumulate evidence under these circumstances without further modifications to the system 200 software. Nevertheless, the system 200 may still reveal a tampering driver's suspicious activity if the driver 164 continues to repeat the same or similar tampering behaviors over time.

As previously discussed, the FSM may execute on a server 140, in a cloud-based computing environment, or on an in-vehicle computing device, such as system 200. If executed on an in-vehicle computing device, the FSM may be distributed to each of the systems 200 within each of the vehicles 112 of the fleet to track the drivers 164 for each vehicle 112 independently in real-time. As soon as DTC-related events occur in a vehicle 112, the FSM on the respective the event detection and reporting system 200 may determine whether the DTC data is suspicious and if so, transmit the suspicious activity evidence to the server 140 and/or cloud-based computing system. This may allow the tampering detection system 100 in accordance with the present subject matter to monitor for and to generate suspicious vehicle alteration evidence from each vehicle 112 independently in a real-time or near real-time manner.

Evidence Interpretation and Scoring

Following labeling of the transitions from one trip, the transitions may also be interpreted based on a series of algorithms that generate a tampering activity score and the distance traveled during suspicious activity. The scores and distances may then be accumulated for a suspicious sequence as it continues from start to end for a same vehicle 112. All the accumulated scores and distances may be summed across all vehicles 112 driven by a particular driver and across all company-vehicle-driver combinations to arrive at a total suspicious score and a total suspicious distance driven for each driver in the fleet. A suspected tamper rating based on, for example, a 1 to 5 scale, may be assigned based on the scores, where 1 may be least severe and 5 may be most severe to simplify the scoring rubric for the fleet manager 160, system administrator 162, or other reviewing party. Other scoring rubrics may be possible without departing from the scope of the present subject matter. The tamper rating and distance driven with potentially suspicious activity may be used to showcase the severity and likeliness of tampering, for example, with a particularly suspect driver-vehicle combination. It may also be determined whether multiple drivers preferentially tamper with a certain make, model, or type of vehicle 112, which may warrant targeted evaluation and/or tampering preventative measures on the certain vehicle 112.

Each transition may be scored in the FSM using a weighted linear equation scheme based on the transition type, the vehicle speed at which either the first DTC occurs on the trip or an average of the DTC vehicle speeds during the trip, and the distance at which the first DTC occurred. The transition scores may be computed using the following formula:

$$\text{weighted\_transition\_score} = \text{DTC\_distance\_weight} * \text{DTC\_speed\_weight} * \text{transition\_score}$$

The transition_score quantity may be evaluated based on the transition type as provided in Table 7 below. For purposes of discussion, the steering angle sensor (SAS) 218 is used again as an example DTC-generating sensor. Alternate transition scores may be assigned for other types of DTC-generating sensors.

TABLE 7

| Transition Enumerated Value | Transition | Transition Score |
| --- | --- | --- |
| SAS_Start_Driver | Start tampering, same driver as prior trip. | 0.5 |
| SAS_Start_Driver | Start tampering, new driver. | 1 |
| SAS_Continued_Driver | Continued tampering, same driver as prior trip. | 1 |
| SAS_Stop_Same_Driver | Stop tampering, same driver as prior trip. | 0.5 |
| SAS_Stop_New_Driver | Stop tampering, new driver. | 1 |

If a DTC occurs earlier during a trip, it may have a greater weight in the overall weighted_transition_score than if the DTC occurred later in a trip. As previously discussed, a tampering driver 164 may achieve the maximum benefit from tampering when it is performed early during a trip. A DTC that occurs later in the trip may be more likely to be from normal, non-tampering reasons, such as a failing sensor, a vehicle collision, a worn-out vehicle component, and the like. The distance-based discount weight may be referred to as the DTC_distance_weight. This quantity may be inversely proportional to the distance into the trip in which the DTC occurs when compared with the total trip length. Accordingly, when a DTC occurs toward the beginning of a trip, the DTC_distance_weight may be allocated a score of 1, while a DTC that occurs toward the end of the trip may be allocated a score of 0. The DTC_distance_weight may be computed using the following formula:

DTC_distance_weight=(TripLength−DistanceIntoTrip)/TripLength where TripLength may be the total trip length and DistanceIntoTrip may be the current distance into the trip when the DTC occurs.

A greater weight may be assigned to the overall weighted_transition_score if the DTC occurs at a lower speed than a higher speed. This may be because a tampering driver 164 may be more likely to perform the tampering while the vehicle is parked or at low speeds than while moving or moving at faster speeds (e.g., on a highway). For example, it may be difficult or impossible to tamper with certain vehicle systems, sensors, and components while the vehicle is in motion based on the complexity and locations of the systems, sensors, and components. The weight favoring non-moving or low speeds may be referred to as the DTC_speed_weight. This quantity may be inversely proportional to the vehicle speed when a DTC occurs. This quantity may decay to zero at speeds greater than 65 miles per hour, for example, since it may become increasingly implausible for a driver to tamper at that speed. The speed at which the DTC_speed_weight decays to zero may be adjustable by a user and may be computed using the following formula:

DTC_speed_weight=MAX{(65MPH−DTC_MPH)/65MPH,0} where DTC_MPH is the vehicle speed at which the DTC occurs.

The weighted_transition_scores for each tampering sequence may be accumulated (i.e., iteratively summed) in a cumulative score variable per company-vehicle-driver combination until the suspected tampering ceases or the data stream is exhausted. When the accumulation is finished, the produced cumulative score may be equivalent to the total_tampering_score, using the formula below:

total_tampering_score=$\Sigma_{trip=1}^{trip=N}$weighted_transition_score where N is the number of trips taken for a specific driver-vehicle combination.

A benefit-weighted tampering score may also be calculated based on the total_tampering_score, as well as the distance traveled while tampering is occurring. The benefit-weighted tampering score may consider the benefit that a tampering driver would achieve from tampering, with greater benefit to be derived from longer trips. The benefit weight may be based on the distance traveled during suspicious activity that might benefit the driver. An example mapping from the total benefit (tampering/DTC) distance accumulated across all the tampering sequences for a vehicle 112, to the tampering benefit weight for scoring is provided in Table 8 below.

TABLE 8

| Benefit (Tampering/DTC) Distance Traveled | Benefit Weight |
| --- | --- |
| ≥300 miles | 2 |
| ≥180 miles | 1.5 |
| ≥60 miles | 1.25 |
| ≥30 miles | 1 |
| <30 miles | Tampering distance driven/30.0 |

The benefit-weighted tampering score may be computed using the following formula:

benefit_weighted_score=total_tampering_score*benefit_weight

Finally, an example tamper rating may be assigned based on the total benefit-weighted tampering score based on Table 9 below.

TABLE 9

| Tamper Rating | Total Benefit-Weighted Tampering Score (S) |
| --- | --- |
| 1 | 1 ≤ S < 2 |
| 2 | 2 ≤ S < 3 |
| 3 | 3 ≤ S < 4 |
| 4 | 4 ≤ S < 5 |
| 5 | S ≥ 5 |

In the end, a summary per company-vehicle-driver combination of the driver's total tampering score (regular and benefit-weighted) on a vehicle 112, the driver's tamper rating, and the drive's total distance driven while tampering, may be obtained. The vehicle-driver pairs may be subsequently filtered where the tamper rating <1, since those drivers are unlikely to be tampering. Those pairs having a tamper rating ≥1 may be (tamper rating/5) % likely to be tampering or participating in suspicious vehicle activities based on the collected evidence and scoring. Therefore, the driver-vehicle pairs where the tamper rating=5 are highly likely to be tampering. The FSM and scoring rubric previously discussed are versatile and may be adjusted based on customer needs or changes in the available data.

The following example may illustrate the use of the previously discussed scoring rubric. Each of three drivers (a, b, c) may conduct a trip in the following sequence. First, driver "a" may conduct a normal trip while operating vehicle "z." Next, driver "b" may conduct a tampering trip while operating vehicle "z." Driver "b" may travel a total of 300 miles, where a suspicious DTC is generated at a vehicle speed of 0 MPH after traveling 1 mile into the trip. Lastly, driver "c" may conduct a normal trip while operating vehicle "z."

The total tampering score may be computed as follows:

$$\text{total\_tampering\_score} = \sum_{trip=1}^{trip=N} \text{weighted\_transition\_score} =$$

(transition 1 score) + (transition 2 score) =

(Start tampering, new driver) +

(Stop tampering, new driver) = 1 + 1 = 2

The benefit-weighted tampering score may be computed as follows with reference to Table 8:

benefit_weighted_score = total_tampering_score*benefit_weight = 2*1.5 = 3

Accordingly, from Table 9, it may be seen that the tamper rating for driver "b" is 3 and the tampering distance is 299 miles. For this suspected tampering sequence, the evidence may be summarized as follows: Suspected Tampered Vehicle: "z"; Suspected Tampering Driver: "b"; total_tampering_score: 2; benefit_weighted_tampering_score: 3; tamper_rating: 3; tampering distance traveled: 299 miles. As the tamper rating for driver "b" when paired with vehicle "z" is 3 out of 5, it is approximately 60% likely that tampering has occurred based on the available evidence.

Story Generation

A story or timeline may be generated by the tampering detection system 100 based on the evidence collected from the FSM, as well as from the transitions and total scores calculated. The story may provide the administrative user, such as the fleet manager 160 or system administrator 162 a better way to understand what happened while one or more drivers 160 operated a vehicle 112 or transferred it to a new driver 160 along with whether DTCs started, continued, or ended, as each driver 160 took possession. The story may include, but is not limited to the following points: whether and which DTCs started, continued, or ended as each driver 160 operated the vehicle 112; the distance the vehicle 112 traveled while DTCs were present on the vehicle (i.e., the benefit distance traveled); the proportion of trips for a driver 160 where DTCs occurred when compared with the driver's total number of trips; the quantity of instances where DTCs occurred at the beginning of the trip while stopped or at low speeds; and the sensors and/or systems that were affected based on the collected DTCs.

Using the prior example of three drivers (a, b, c), an example story may be constructed as: "Driver 'a' took vehicle 'z' on a normal trip. Then, driver 'b' took a longer trip of 300 miles upon which suspicious DTCs presented themselves on the vehicle CAN bus from one mile into the trip at a speed of 0 MPH. Driver 'b' eventually parked the vehicle and handed the keys to driver 'c.' Driver 'c' then proceeded to take a normal trip on vehicle 'z,' incurring no suspicious DTCs. Through our evidence collection and scoring mechanisms, we suspect that driver 'b' tampered with the steering angle sensor of vehicle 'z' during her drive and may have reaped the benefits of no related safety controls or events for 299 miles."

These descriptive stories may be generated by a set of algorithms that interpret the collected evidence, such as FSM transitions, distances, speeds, times, etc., and construct text phrases that describe the evidence. The algorithms could be implemented, for example, using a series of IF-THEN-ELSE logic statements or even a machine-learning model that learns, based on training the model using labeled suspicious activity (i.e., supervised learning), sequences collected over time.

For reference, and in support of the algorithms for which the programmed processors and other computing devices disclosed herein execute instructions to implement the tamper detection system, an example of pseudocode for the FSM transitions and evidence accumulation in the context is provided in Table 10. It should be appreciated that the pseudocode in Table 10 references DTCs generated based on the steering angle sensor (SAS) 218 as an example, but the pseudocode is equally applicable to DTCs may also be generated based on other sensors, systems, and/or system components without departing from the scope of the present subject matter.

Pseudocode for Vehicle FSM Transitions and Evidence Accumulation

TABLE 10

| Transition | States | SQL Logic | Evidence Accumulated |
|---|---|---|---|
| 1 | C to D | LAG window func: DrvrBefore = CurrDrvr AND CurrDrvr != NULL AND SASTrip = 1 AND SASTripBefore = 0 | SAS_Start_Driver added to transition list Distance from DTC to end of trip added to benefit distance Transition score updated |
| 2 | C to D | LAG window func: DrvrBefore != CurrDrvr AND CurrDrvr != NULL AND SASTrip = 1 AND SASTripBefore 0 | SAS_Start_Driver added to transition list Distance from DTC to end of trip added to benefit distance SAS_Greed_Driver added to transition list Transition score updated |
| 3 | D to E | LAG window func: DrvrBefore = CurrDrvr AND CurrDrvr != NULL AND SASTrip = 1 AND SASTripBefore = 1 | SAS_Cont_Driver added to transition list Distance from DTC to end of trip added to benefit distance Transition score updated |
| 3 | E to E | LAG window func: DrvrBefore = CurrDrvr AND CurrDrvr != NULL AND SASTrip = 1 AND SASTripBefore = 1 | SAS_Cont_Driver added to transition list Distance from DTC to end of trip added to benefit distance Transition score updated |
| 4 | D to C | LEAD window func: CurrDrvr = DrvrAfter AND CurrDrvr != NULL AND SASTrip = 1 AND SASTripAfter = 0 | SAS_Stop_Same_Driver added to transition list Transition score updated |
| 4 | E to C | LEAD window func: CurrDrvr = DrvrAfter AND CurrDrvr != NULL AND SASTrip = 1 AND SASTripAfter = 0 | SAS_Stop_Same_Driver added to transition list Transition score updated |
| 5 | D to C | LEAD window func: CurrDrvr != DrvrAfter AND CurrDrvr != NULL AND SASTrip = 1 AND SASTripAfter = 0 | SAS_Stop_New_Driver added to transition list Transition score updated |
| 5 | E to C | LEAD window func: CurrDrvr != DrvrAfter AND CurrDrvr != NULL AND SASTrip = 1 AND SASTripAfter = 0 | SAS_Stop_New_Driver added to transition list Transition score updated |

TABLE 10-continued

| Transition | States | SQL Logic | Evidence Accumulated |
|---|---|---|---|
| 6 | D to E | LAG window func: DrvrBefore != CurrDrvr AND CurrDrvr != NULL AND SASTrip = 1 AND SASTripBefore = 1 | SAS_Start_Driver added to transition list Distance from DTC to end of trip added to benefit distance Transition score updated |

All Possible Paths Through FSM without Repetition

Table 11 describes all possible paths through the FSM. In the "Driver/Trip" column of Table 11, an asterisk ("*") indicates that DTCs occurred during the trip.

TABLE 11

| Path | Driver/Trip | Description |
|---|---|---|
| 1, 4 | A, A*, A | Driver A drove the vehicle for multiple consecutive trips and had 1 trip with SAS DTCs that occurred between two normal trips. |
| 2, 4 | A, B*, B | Multiple drivers drove the vehicle. First, driver A took a normal trip on the vehicle. Then, there was a driver change from A to B. B proceeded to take a trip on the vehicle with SAS DTCs. Then B took another trip on the vehicle and had no DTCs occur. |
| 1, 5 | A, A*, B | Multiple drivers drove the vehicle. Driver A had a normal trip followed by a DTC trip. A driver change occurred from A to B, then B took a normal trip on the vehicle. |
| 2, 5 | A, B*, C | Multiple drivers drove the vehicle. Driver A had a normal trip. Driver change occurred from A to B. B then had a DTC trip on the vehicle. Driver change occurred from B to C. C then took a normal trip on the vehicle. |
| 1, 3, 4 | A, A*, A*, A | Driver A drove the vehicle for multiple consecutive trips. They took a normal trip followed by a series of multiple consecutive DTC trips. The last DTC trip was followed by another normal trip. |
| 2, 3, 4 | A, B*, B*, B | Driver A drove the vehicle during a normal trip. A driver change took place from A to B. Driver B proceeded to take multiple consecutive DTC trips on the vehicle. Then suddenly driver B had a normal trip on the vehicle also. |
| 1, 3, 5 | A, A*, A*, B | Multiple drivers drove the vehicle. Driver A had a normal trip followed by multiple consecutive DTC trips. A driver change occurred from A to B, then B took a normal trip on the vehicle. |
| 2, 3, 5 | A, B*, B*, C | Multiple drivers drove the vehicle. Driver A had a normal trip. Driver change occurred from A to B. B then had multiple consecutive DTC trips on the vehicle. Driver change occurred from B to C. C then took a normal trip on the vehicle. |
| 1, 6, 4 | A, A*, B*, B | Multiple drivers drove the vehicle. Driver A had a normal trip followed by at least one consecutive DTC trip. Driver change occurred from A to B. B then had one or more consecutive DTC trips on the vehicle. B then took a normal trip on the vehicle. |
| 1, 6, 5 | A, A*, B*, C | Multiple drivers drove the vehicle. Driver A had a normal trip followed by at least one consecutive DTC trip. Driver change occurred from A to B. B then had one or more consecutive DTC trips on the vehicle. Driver change occurred from B to C. C then took a normal trip on the vehicle. |
| 2, 6, 4 | A, B*, C*, C | Multiple drivers drove the vehicle. Driver A had a normal trip. Driver change occurred from A to B. B then took at least one consecutive DTC trip. Driver change occurred from B to C. C then had one or more consecutive DTC trips on the vehicle. C then took a normal trip on the vehicle. |
| 2, 6, 5 | A, B*, C*, D | Multiple drivers drove the vehicle. Driver A had a normal trip. Driver change occurred from A to B. B then took at least one consecutive DTC trip. Driver change occurred from B to C. C then had one or more consecutive DTC trips on the vehicle. Driver change occurred from C to D. D then took a normal trip on the vehicle. |

Vehicle Switching at "Jumps" Hypothesis

Fleet drivers 164 may often use multiple vehicles 112 for their work. Each switch from one vehicle 112 to another may be determined from a driver's work records. The determined switches may be compared with any changes in DTCs or DTC patterns that may have been detected for a driver, as described above. If the "jump" in DTCs coincides with the vehicle change, the driver may be questioned as to whether a problem exists and assistance may be provided as needed. It is also possible, however, that the driver has switched to an "ornery" vehicle, which may be difficult to control, and on which multiple drivers exhibit reduced performance. The next section examines how such "cursed" or "lemon" vehicles may be identified.

Cursed/Lemon Vehicle Detection

Some vehicles may be difficult to operate because their associated systems may be damaged, of substandard design, or in need of routine maintenance. To detect such vehicles that may be difficult to operate for any of a variety of reasons, the frequency of safety-related DTCs occurring on those difficult vehicles and other vehicles may be statistically exploited. Note that vehicle 112 may be taken as tractor and/or trailer together or separately, so difficult tractors alone may be separated from individual trailers that reduce driver 164 performance. Whether a vehicle is "cursed" or difficult may be interpreted in a binary or non-binary fashion, and this information may be used to determine where service, changes, training, etc., may be needed.

It may be necessary to first distinguish the driver 164 from the vehicle 112. For example, performance data may reveal that several drivers 164 all perform worse than usual performance on a specific vehicle 112. This may be indicative of a "curse," or in other words, that the vehicle 112 is at least partially responsible for the reduced driver performance. Detecting the curse can be achieved via statistical techniques.

Individual drivers 164 may exhibit a distribution of performance, varying about a mean, central value. The performance may be evaluated based on, for example, the number of lane departures per mile that a driver 164 produces with any given vehicle 112, the number of excessive braking events per hour, or any other event whose spatial or temporal frequency or severity may be measured. Severity may be quantified, for example, using the standard deviation of the lane position that a driver 164 has on a given vehicle 112. The deviations from the mean may be measured by a Z-score, which may be defined as the number of standard deviations a score is away from the mean. A table may be constructed with a list of vehicles 112 and the drivers 164 that use them. The entries of the table may be the Z-scores of the drivers 164 from their mean values. Table 12 below may be an example table illustrating this concept.

TABLE 12

| Driver | Vehicles | | | Mean Driver Score |
| --- | --- | --- | --- | --- |
| | A | B | C | |
| 1 | $Z_{1A}$ | $Z_{1B}$ | $Z_{1C}$ | $\overline{D}_1$ |
| 2 | $Z_{2A}$ | $Z_{2B}$ | $Z_{2C}$ | $\overline{D}_2$ |
| 3 | $Z_{3A}$ | $Z_{3B}$ | $Z_{3C}$ | $\overline{D}_3$ |
| Mean Vehicle Score | $\overline{V}_A$ | $\overline{V}_B$ | $\overline{V}_C$ | |

As shown in Table 12, for a given vehicle "B," Driver 1 has a Z-score of $Z_{1B}$, Driver 2 has $Z_{2B}$, Driver 3 has $Z_{3B}$. These Z-scores may be averaged to produce the values in the lowest row ($\overline{V}_A$, $\overline{V}_B$, $\overline{V}_C$), reflecting the improvement or worsening of driver performance when using a specific vehicle ("B"). Those vehicles having a sufficiently large average indicating worse Z-scores may be declared "cursed." To ensure that the scatter in the drivers' Z-scores is not too large, it may be preferable to ensure that sufficiently different drivers have used the vehicle. This may improve the confidence in stating whether the vehicle is "cursed." Stated differently, it may be desirable to have a distribution of enough drivers' Z-scores whose mean location is sufficiently divorced from their normal driving performance, measured by a Z-score, which may be expressed as:

(mean of drivers'Z-scores)/(standard deviation of those drivers'Z-scores)

If enough drivers consistently perform worse than their usual driving when using a specific vehicle, it may be likely that a problem exists with that vehicle. If the reduced performance has been further narrowed down by type of performance, such as lane position, this is helpful in guiding what shall be done with the vehicle. A vehicle 112 in which maintaining lane position is difficult may need a wheel alignment, tire pressure adjustment, and the like, for example. A vehicle 112 that is identified as "cursed" based on the previously disclosed techniques may be used to reduce and/or offset the tamper rating of a suspected driver.

The first, second, and third tampering detection tests may be applied in a hierarchical, coarse-to-fine manner. For example, the tampering detection system 100 may start with the binomial test, then the more specific Mann-Whitney test, and finally the most complicated and most specific FSM-based reconstruction of when and where tampering happened. If at any point in this hierarchy, tampering is determined with a confidence value that exceeds a predetermined threshold, any remaining tampering detection tests may be omitted. This non-execution of remaining tests may save unnecessary computation. If the confidence value does not meet the predetermined threshold or if history extraction is an important component of the result, then all tests may be executed to produce a higher quality prediction that extracts and evaluates tampering histories.

The FSM may be the most complicated test and may have the most arbitrarily-settable parameters associated with it. In general, the historical data and patterns of data associated with a vehicle 112 and a driver 164 may be evaluated using the FSM to extract evidence in support of or against whether a vehicle 112 has been tampered with and/or whether a driver 164 has been tampering. The tampering detection system 100 may provide a list of suspected tampering drivers 164 to a fleet of commercial vehicles. Each vehicle 112 of the fleet of commercial vehicles may confirm whether a suspected tampering driver 164 is justified and return supporting data that includes, for example, vehicle location data, DTC data, driver behavior data, driver identification data, vehicle sensor data, trip data, and the like. As the commercial vehicle fleet returns this supporting data, the tampering detection system 100 may adjust or allow a user to adjust the arbitrarily-settable parameters to better distinguish confirmed tampering drivers 164 from confirmed non-tampering drivers 164. These parameters may be adjusted by optimization-based mathematical methods, where the objective function may be taken as the rate of proper classification for confirmed and unconfirmed tampering. It may be desirable to have the fewest false positive confirmations of tampering, so the classification precision may be a useful objective function also.

The FSM may determine when and where tampering is suspected to have occurred via time and location data. The time and location data may be provided, for example, by a global positioning (GPS) receiver. Additional information may be utilized by the FSM to assess how the tampering occurred. This determination may be used to produce a story or timeline with which the suspected tampering drive may be confronted. While it is expected that suspected drivers 164 may admit tampering, those suspected drivers 164 who do not may be removed from the FSM parameter optimization.

It may be important to determine what constitutes "DTC background noise," as previously discussed. It may be assumed tampering is rare such that the bulk of DTCs may be benign, and the associated statistics for these DTCs may be calculated. The "DTC background noise" may be differentiated from the DTCs providing evidence of tampering by time or by distance. For example, it may be assumed that the average time between DTCs is 120 minutes with a standard deviation of 20 minutes. In this case, it may be determined that any DTCs occurring more frequently than every 100 minutes are suspicious but those occurring at intervals greater than 100 minutes are expected with some probability.

The present subject matter may improve the ability of computing systems to detect tampering of a vehicle system based on applying a hierarchy of tests. The tests may assist in identifying a driver 164 who may have tampered with one or more vehicle systems by evaluating the presence of diagnostic trouble codes (DTCs). The DTCs may occur during one or more trips conducted by a driver. The embodiments disclosed herein may allow for the computing system to determine whether the DTCs are occurring as part of the inevitable vehicle wear and tear or because of tampering by a driver 164 of the vehicle. The present subject matter may facilitate identifying tampering drivers based on evaluating patterns of DTCs that occur across multiple drivers and across multiple vehicles. By identifying drivers that tamper with vehicle systems, fleet managers and other users of the disclosed tamper detection system may be able to reduce the associated risks and losses associated with tampering.

Still another aspect of the present subject matter is to provide one or more forms of system control in response to detecting driver tampering. In one embodiment, a determination that tampering has occurred may result in reactivating warnings that the tampering was originally intended to silence, activating, or altering other warnings, and/or providing warning in an earlier fashion than with the usual parameterization. In addition, certain aspects of vehicle operation may be limited, e.g., max vehicle speed, until the detected tampering is removed or otherwise remedied.

In other embodiments, it may be desirable to provide notifications to the driver 164 in the vehicle regarding the detected tampering, including notifying the driver 164 of an adjustment to the control system on the vehicle because of abnormal or lack of sensor readings, etc. It may also warn the driver 164 that the fleet manager 160 will be warned about the tampering occurrence. It may attach to the driver's performance record for the fleet, which discounts or ignores the driver's performance associated with the period of time over which the detected tampering occurred.

In still further embodiments, a detected tampering may result in activation of one or more nominal filtered or derived sensor values based on other operational sensors to correct unordinary truck controls. For example, the system may provide steering corrections for lateral position (since the driver 164 does not worry about lateral position as often without LDWs) and braking/throttle corrections based on longitudinal or accelerometer position, for example, riding up on the vehicle ahead or driving wildly along curves when sensed by fused camera and accelerometer values may trigger application of XBR or another braking mechanism such steer-by-brake, to mitigate potential accident when necessary. The driver's command values of these required—vehicles have a throttle, brake, and steering—actuators may function as inputs to virtual sensors, replacing the tampered with sensors by their inferred, though imperfect, equivalents (FLC for steering, radar or lidar for throttle and brake)

Finally, driver feedback may be provided as to the extent to which the tampering was detected with one or more attendant negative consequences also occurring, including lower pay, suspension, termination, etc.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps, or acts are in some way inherently mutually exclusive.

Reference throughout this document to "one embodiment", "certain embodiments", "an embodiment" or similar term means that a feature, structure, or characteristic described in connection with the embodiment is included in at least one embodiment of the present subject matter. Thus, the appearances of such phrases or in various places throughout this specification are not necessarily all referring to the same embodiment. Furthermore, the features, structures, or characteristics may be combined in any suitable manner without limitation.

In accordance with the practices of persons skilled in the art of computer programming, the present subject matter is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have electrical, magnetic, optical, or organic properties corresponding to the data bits.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor 230 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, any physical medium with patterns of holes, a RAM, PROM, and EPROM, a FLASH-EPROM, any other memory chip or cartridge, or any other tangible non-transitory medium from which a computer can read.

In addition, and further in accordance with the descriptions herein, the term "logic," as used herein, with respect to FIG. 2A, includes hardware, firmware, software in execution on a machine, and/or combinations of each to perform a function(s) or an action(s), and/or to cause a function or action from another logic, method, and/or system. Logic may include a software-controlled microprocessor, a discrete logic (e.g., ASIC), an analog circuit, a digital circuit, a programmed logic device, a memory device containing instructions, and so on. Logic may include one or more gates, combinations of gates, or other circuit components.

The foregoing disclosure has been set forth merely to illustrate the present subject matter and is not intended to be limiting. Since modifications of the disclosed embodiments incorporating the spirit and substance of the present subject matter may occur to persons skilled in the art, the present subject matter should be construed to include everything within the scope of the appended claims and equivalents thereof.

What is claimed is:

1. A method of detecting tampering with a vehicle operated by a driver, comprising:
   receiving input data generated by an onboard vehicle computing system specifying historical occurrences of at least one diagnostic trouble code (DTC) generated by a processor of the onboard vehicle computing system based on sensor data received by the processor from a vehicle sensor during a trip;
   identifying, based on the input data, a length of the trip;
   identifying, based on the input data, a speed of the vehicle when each of the at least one DTCs were generated;
   identifying, based on the input data, a distance the vehicle had traveled during the trip when each of the at least one DTCs were generated;
   determining:
      (a) a subsequent trip was started based on the input data;
      (b) whether a driver operating the vehicle on the subsequent trip is a same driver or a new driver as the driver that operated the vehicle during the trip based on a driver ID of the input data;
      (c) whether DTCs were generated during the trip based on the input data; and
      (d) whether DTCs were generated during the subsequent trip based on the input data; and
   determining a tamper rating for the driver that indicates a likelihood that the driver has tampered with the vehicle based on one or more of:
      the determinations (a)-(d),
      the identified length of the trip,
      the identified distance the vehicle had traveled during the trip when each of the at least one DTCs were generated, or
      the identified speed of the vehicle for each of the at least one DTCs.

2. The method according to claim 1, further comprising:
   identifying, based on the input data, one or more timestamps that indicate when each of the at least one DTCs were generated;
   determining, based on the one or more timestamps, a distance traveled by the vehicle during which the at least one DTC was generated; and
   determining a benefit weight based on a distance traveled by the vehicle after which the at least one DTC was generated, wherein
      the determination of the tamper rating of the driver is further based on the benefit weight.

3. The method according to claim 1, further comprising:
   determining a total tampering score by accumulating a weighted transition score for the trip and the subsequent trip, wherein
      the weighted transition score is based on:
         the identified distance the vehicle had traveled during the trip when each of the at least one DTCs were generated; and
         the identified speed of the vehicle for each of the at least one DTCs.

4. The method according to claim 3, wherein
   the identified distance the vehicle had traveled during the trip when each of the at least one DTCs were generated is based on a ratio between the identified length of the trip and the distance the vehicle had traveled during the trip for each of the at least one DTCs.

5. The method according to claim 3, wherein
   the weighted transition score is inversely proportional to the identified vehicle speed.

6. The method according to claim 3, wherein
   the weighted transition score is inversely proportional to the identified distance the vehicle had traveled during the trip prior to the generation of the at least one DTC.

7. The method according to claim 1, further comprising:
   attributing a first state of a finite state machine to a first vehicle state when no DTCs have been generated in the vehicle;
   attributing a second state of the finite state machine to a second vehicle state when a first DTC is generated in the vehicle; and
   attributing a third state of the finite state machine to a third vehicle state when at least one second DTC is generated in the vehicle after the first DTC has been generated.

8. The method according to claim 7, further comprising:
   scoring each transition of the finite state machine between any of the first, second, or third states and a subsequent state based on a transition score value that varies based on at least one of determinations (a), (b), (c), or (d); and
   determining a weight transition score based on:
      the transition score; and
      the identified distance the vehicle had traveled during the trip for each of the at least one DTCs; or
      the identified speed of the vehicle for each of the at least one DTCs.

9. The method according to claim 1, further comprising:
   generating, based on the input data, a textual story comprising:
      a listing of the at least one DTCs that were generated;
      whether DTCs started, continued, or ended as the driver and any new drivers operated the vehicle;
      the distance the vehicle traveled after DTCs had been generated in the vehicle for each driver;
      a proportion of trips for the driver where DTCs occurred when compared with the driver's total number of trips;
      a quantity of trips where DTCs occurred at the beginning of the trip while stopped or at low vehicle speeds; and
      a listing of sensors and/or systems that were affected based on the at least one generated DTCs.

10. The method according to claim 1, further comprising:
    determining a performance metric of the driver when operating the vehicle;
    determining the performance metric of a plurality of additional drivers when operating the vehicle;
    determining the performance metric of the driver and the plurality of additional drivers when operating a plurality of additional vehicles;
    determining that the vehicle is cursed based on a mean performance metric of the driver and additional drivers for the vehicle indicating reduced performance when compared with a mean performance metric of the driver and additional drivers for the plurality of additional vehicles; and
    offsetting the determined tamper rating of the driver based on the determination that the vehicle is cursed such that the tamper rating indicates that indicates a reduced likelihood that the driver has tampered with the vehicle.

11. A tampering detection system to detect tampering of an electronic system of a vehicle operated by a driver, comprising:

a processor;
a memory in communication with the processor, the memory storing a plurality of instructions executable by the processor to cause the system to:
receive input data generated by an onboard vehicle computing system specifying historical occurrences of at least one diagnostic trouble code (DTC) generated by the onboard vehicle computing system based on sensor data received from a vehicle sensor during a trip;
identify, based on the input data, a length of the trip;
identify, based on the input data, a speed of the vehicle when each of the at least one DTCs were generated;
identify, based on the input data, a distance the vehicle had traveled during the trip when each of the at least one DTCs were generated;
determine:
  (a) a subsequent trip was started based on the input data;
  (b) whether a driver operating the vehicle on the subsequent trip is a same driver or a new driver as the driver that operated the vehicle during the trip based on a driver ID of the input data;
  (c) whether DTCs were generated during the trip based on the input data; and
  (d) whether DTCs were generated during the subsequent trip based on the input data; and
determine a tamper rating for the driver that indicates a likelihood that the driver has tampered with the vehicle based on one or more of:
  the determinations (a)-(d),
  the identified length of the trip,
  the identified distance the vehicle had traveled during the trip when each of the at least one DTCs were generated, or
  the identified speed of the vehicle for each of the at least one DTCs.

12. The tampering detection system according to claim 11, further comprising instructions to cause the system to:
identify, based on the input data, one or more timestamps that indicate when each of the at least one DTCs were generated;
determine, based on the one or more timestamps, a distance traveled by the vehicle during which the at least one DTC was generated; and
determine a benefit weight based on a distance traveled by the vehicle after which the at least one DTC was generated, wherein
the determination of the tamper rating of the driver is further based on the benefit weight.

13. The tampering detection system according to claim 11, further comprising instructions to cause the system to:
determine a total tampering score by accumulating a weighted transition score for the trip and the subsequent trip, wherein
the weighted transition score is based on:
  the identified distance the vehicle had traveled during the trip when each of the at least one DTCs were generated; and
  the identified speed of the vehicle for each of the at least one DTCs.

14. The tampering detection system according to claim 13, wherein
the identified distance the vehicle had traveled during the trip when each of the at least one DTCs were generated is based on a ratio between the identified length of the trip and the distance the vehicle had traveled during the trip for each of the at least one DTCs.

15. The tampering detection system according to claim 13, wherein
the weighted transition score is inversely proportional to the identified vehicle speed.

16. The tampering detection system according to claim 13, wherein
the weighted transition score is inversely proportional to the identified distance the vehicle had traveled during the trip prior to the generation of the at least one DTC.

17. The tampering detection system according to claim 11, further comprising instructions to cause the system to:
attribute a first state of a finite state machine to a first vehicle state when no DTCs have been generated in the vehicle;
attribute a second state of the finite state machine to a second vehicle state when a first DTC is generated in the vehicle; and
attribute a third state of the finite state machine to a third vehicle state when at least one second DTC is generated in the vehicle after the first DTC has been generated.

18. The tampering detection system according to claim 17, further comprising instructions to cause the system to:
score each transition of the finite state machine between any of the first, second, or third states and a subsequent state based on a transition score value that varies based on at least one of determinations (a), (b), (c), or (d); and
determine a weight transition score based on:
  the transition score; and
  the identified distance the vehicle had traveled during the trip for each of the at least one DTCs; or
  the identified speed of the vehicle for each of the at least one DTCs.

19. The tampering detection system according to claim 11, further comprising instructions to cause the system to:
generate, based on the input data, a story comprising:
  a listing of the at least one DTCs that were generated;
  whether DTCs started, continued, or ended as the driver and any new drivers operated the vehicle;
  the distance the vehicle traveled after DTCs had been generated in the vehicle for each driver;
  a proportion of trips for the driver where DTCs occurred when compared with the driver's total number of trips;
  a quantity of trips where DTCs occurred at the beginning of the trip while stopped or at low vehicle speeds; and
  a listing of sensors and/or systems that were affected based on the at least one generated DTCs.

20. The tampering detection system according to claim 11, further comprising instructions to cause the system to:
determine a performance metric of the driver when operating the vehicle;
determine the performance metric of a plurality of additional drivers when operating the vehicle;
determine the performance metric of the driver and the plurality of additional drivers when operating a plurality of additional vehicles;
determine that the vehicle is cursed based on a mean performance metric of the driver and additional drivers for the vehicle indicating reduced performance when compared with a mean performance metric of the driver and additional drivers for the plurality of additional vehicles; and offset the determined tamper rating of the driver based on the determination that the vehicle is cursed such that the tamper rating indicates that indicates a reduced likelihood that the driver has tampered with the vehicle.

* * * * *